United States Patent
Putnam et al.

(10) Patent No.: US 8,837,298 B2
(45) Date of Patent: Sep. 16, 2014

(54) VOICE QUALITY PROBE FOR COMMUNICATION NETWORKS

(75) Inventors: Kevin Putnam, Nashua, NH (US); Sreenivasan Alakappan, Westford, MA (US); Steve Lizotte, Tewksbury, MA (US); Laslo Turner, Manchester, NH (US); Mark Figura, Methuen, MA (US); Eric Doiron, Burlington, MA (US)

(73) Assignee: Empirix, Inc., Billerica, MA (US)

( * ) Notice: Subject to any disclaimer, the term of this patent is extended or adjusted under 35 U.S.C. 154(b) by 475 days.

(21) Appl. No.: 13/016,650

(22) Filed: Jan. 28, 2011

(65) Prior Publication Data

US 2011/0254961 A1 Oct. 20, 2011

Related U.S. Application Data

(60) Provisional application No. 61/325,014, filed on Apr. 16, 2010.

(51) Int. Cl.
*G06F 15/173* (2006.01)
*G10L 15/00* (2013.01)
*H04L 12/26* (2006.01)

(52) U.S. Cl.
CPC .............. *H04L 43/08* (2013.01); *H04L 43/087* (2013.01); *H04L 43/16* (2013.01); *H04L 43/0864* (2013.01); *H04L 43/10* (2013.01); *H04L 43/12* (2013.01)
USPC ............................. 370/241; 709/224; 704/233

(58) Field of Classification Search
USPC ............... 370/238, 241, 252, 351, 356, 401; 709/224, 231, 239, 240, 241, 242; 704/216, 233, 270.1, 220, 227
See application file for complete search history.

(56) References Cited

U.S. PATENT DOCUMENTS

| | | | |
|---|---|---|---|
| 5,572,570 A | 11/1996 | Kuenzig | |
| 5,835,565 A | 11/1998 | Smith et al. | |
| 6,091,802 A | 7/2000 | Smith et al. | |
| 7,218,895 B1 | 5/2007 | Raghavan | |
| 7,447,158 B2 | 11/2008 | Savage et al. | |
| 7,505,418 B1 | 3/2009 | Liang et al. | |
| 2002/0167937 A1* | 11/2002 | Goodman | 370/352 |
| 2003/0093513 A1* | 5/2003 | Hicks et al. | 709/224 |
| 2003/0200303 A1* | 10/2003 | Chong | 709/224 |
| 2005/0015253 A1* | 1/2005 | Rambo et al. | 704/246 |
| 2005/0237950 A1* | 10/2005 | Yuan et al. | 370/255 |
| 2006/0153174 A1* | 7/2006 | Towns-von Stauber et al. | 370/356 |
| 2006/0245364 A1* | 11/2006 | Zhu et al. | 370/241 |
| 2007/0183339 A1* | 8/2007 | Rousell et al. | 370/252 |
| 2008/0117831 A1* | 5/2008 | Nielsen | 370/252 |
| 2008/0123546 A1* | 5/2008 | Isono et al. | 370/252 |

* cited by examiner

*Primary Examiner* — Michael Thier
*Assistant Examiner* — Prince A Mensah
(74) *Attorney, Agent, or Firm* — Baker & Hostetler LLP

(57) ABSTRACT

Embodiments emulate agents in a contact center, or enterprise, that initiate communication sessions to each other over communication networks and measure data quality using one or more metrics. That data measured can include voice and video data. Examples of communication networks used to place the voice calls include Internet Protocol (IP) networks and hybrid networks including more traditional telephony components. The data collected by the emulated agents is sent to a monitoring server. The monitoring server and the emulated agent behavior can be configured and scheduled via a web interface. In addition, the web interface provides the user with detailed reports, performance summaries, and visualizations of data collected, further enabling the user to troubleshoot a contact center or enterprise over a variety of communication networks.

32 Claims, 16 Drawing Sheets

| PROFILES | | | | |
|---|---|---|---|---|
| ADD CLONE MODIFY REMOVE IMPORT EXPORT | | | | |
| NAME | USER GROUP | DATA SOURCES | DESCRIPTION | TYPE |
| ALTEON 184 SWITCH | DEFAULT | PING, SNMP | ALTEON 184 SWITCH | ADVANCED |
| ALTEON 2424 SWITCH | DEFAULT | PING, SNMP | ALTEON 2424 SWITCH | ADVANCED |
| APACHE FOR LINUX | DEFAULT | URL, VIRTUAL AGENT | APACHE CPU LOAD... | ADVANCED |
| APACHE FOR SOLARIS | DEFAULT | LOG FILE, DIRECTORY, URL, VIRTUAL AGENT | APACHE WEB SERVER 1.3.X FOR SOLARIS | ADVANCED |
| APACHE FOR WINDOWS | DEFAULT | LOG FILE, DIRECTORY | APACHE LOGFILE SIZE... | ADVANCED |
| APACHE WEBSERVER | DEFAULT | URL | A PROFILE FOR THE AP... | ADVANCED |
| APC SYMMETRA | DEFAULT | SNMP | PROFILE FOR APC SYM... | ADVANCED |
| ATG DYNAMO | DEFAULT | SNMP | ATG DYNAMO PROFILE | ADVANCED |
| BEA WEBLOGIC SERVER 5.X | DEFAULT | SNMP | BEA WEBLOGIC APPLICATION SERVER 5.X | ADVANCED |
| CHECKPOINT FIREWALL | DEFAULT | SNMP | CHECKPOINT FIREWALL, V4.X | ADVANCED |
| CISCO 3500 XL SERIES | DEFAULT | SNMP | CISCO 3500 XL SERIES ... | ADVANCED |
| COLDFUSION SERVER | DEFAULT | PERFMON, SNMP | COLDFUSION APPLICA... | ADVANCED |

☒ PROFILE IS IN USE AND CANNOT BE REMOVED. ☐ PROFILE IS NOT IN USE AND MAY BE REMOVED.

CLOSE   HELP

FIG. 3A

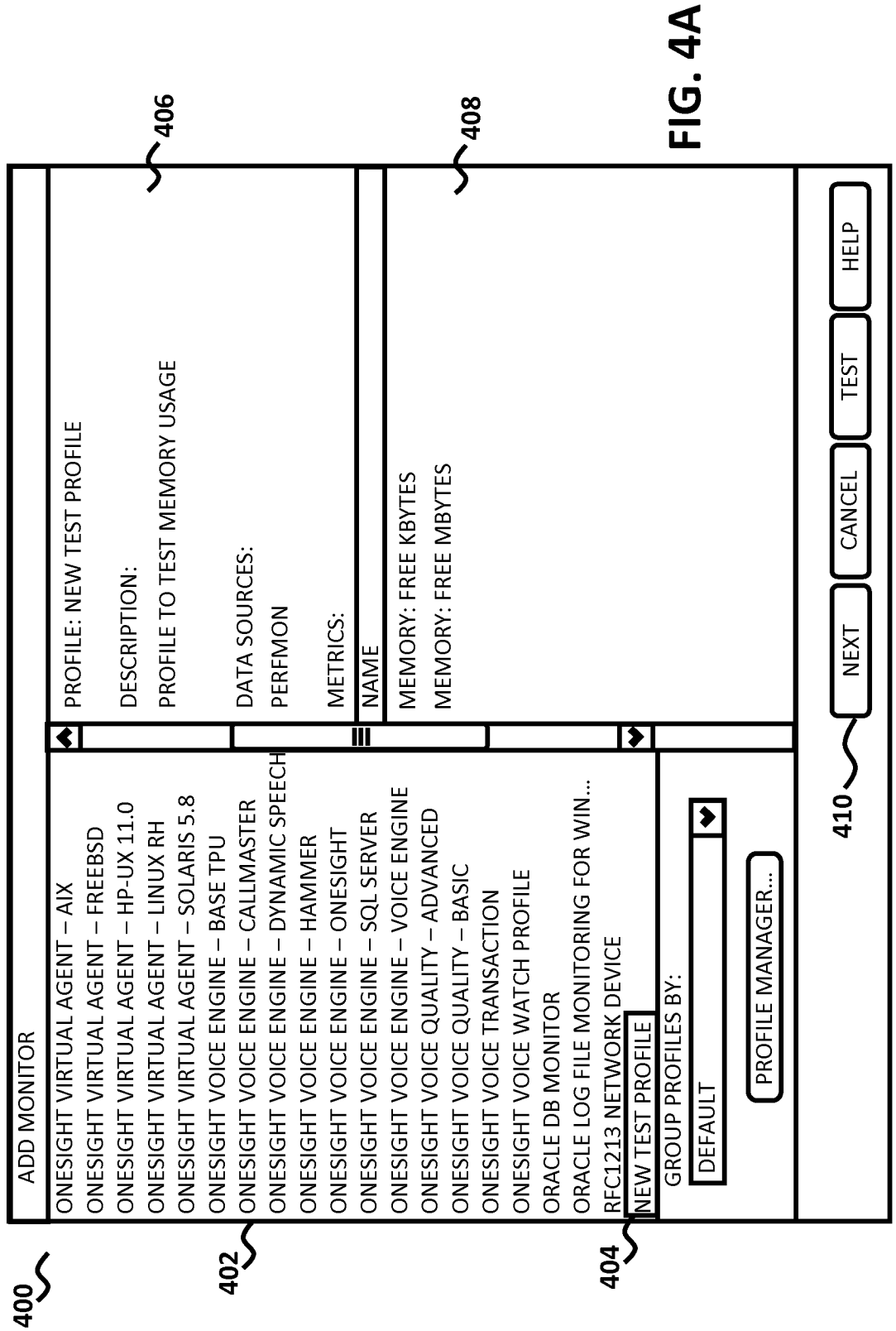

| METRIC | VALUE | | |
|---|---|---|---|
| VOICE QUALITY (1003:1004): 09:28:12 AM | | | |
| VOICE QUALITY: SCRIPT STARTED | • SUCCEEDED | | |
| VOICE QUALITY: CALL RESULT | • SUCCEEDED | | |
| | • VQPROBEDEMO:1003 | | • VQPROBEDEMO:1004 |
| VOICE QUALITY: AVERAGE JITTER | • 0.0 MS | | • 0.0 MS |
| VOICE QUALITY: AVERAGE ROUND TRIP TIME | • 0.0 MS | | • 0.0 MS |
| VOICE QUALITY: DROPPED PACKETS | • 0.0 PACKETS | | • 0.0 PACKETS |
| VOICE QUALITY: DUPLICATE PACKETS | • 0.0 PACKETS | | • 0.0 PACKETS |
| VOICE QUALITY: LOST PACKETS | • 0.0 PACKETS | | • 0.0 PACKETS |
| VOICE QUALITY: MOS-LQ SCORE | • 4.5 | | • 4.5 |
| VOICE QUALITY: MAXIMUM JITTER | • 0.0 MS | | • 0.0 MS |
| VOICE QUALITY: MAXIMUM ROUND TRIP TIME | • 0.0 MS | | • 0.0 MS |
| VOICE QUALITY: OUT OF SEQUENCE PACKETS | • 0.0 PACKETS | | • 0.0 PACKETS |
| VOICE QUALITY: PESQ SCORE | • 4.45 | | • 4.45 |
| VOICE QUALITY: RECEIVED PACKETS | • 5267.0 PACKETS | | • 5134.0 PACKETS |
| VOICE QUALITY: TRANSMITTED PACKETS | • 5134.0 PACKETS | | • 5269.0 PACKETS |
| VOICE QUALITY: AUDIO CLIP | • 🔊🔊 | | • 🔊🔊 |
| VOICE QUALITY: REFERENCE AUDIO CLIP | | | |

FIG. 8B

| METRIC | VALUE | | |
|---|---|---|---|
| VOICE QUALITY (H3203-305226:H3203-305227): 09:17:13 | | | |
| VOICE QUALITY: SCRIPT STARTED | SUCCEEDED | | |
| VOICE QUALITY: CALL RESULT | SUCCEEDED | | |
| | H3203:305226 | | H3203:305227 |
| VOICE QUALITY: AVERAGE JITTER | 1.0 MS | | 1.0 MS |
| VOICE QUALITY: AVERAGE ROUND TRIP TIME | 0.0 MS | | 0.0 MS |
| VOICE QUALITY: DROPPED PACKETS | 0.0 PACKETS | | 0.0 PACKETS |
| VOICE QUALITY: DUPLICATE PACKETS | 0.0 PACKETS | | 40.0 PACKETS |
| VOICE QUALITY: LOST PACKETS | 0.0 PACKETS | | 6.0 PACKETS |
| VOICE QUALITY: MOS-LQ SCORE | 4.5 | | 4.27 |
| VOICE QUALITY: MAXIMUM JITTER | 2.0 MS | | 1.0 MS |
| VOICE QUALITY: MAXIMUM ROUND TRIP TIME | 0.0 MS | | 0.0 MS |
| VOICE QUALITY: OUT OF SEQUENCE PACKETS | 0.0 PACKETS | | 0.0 PACKETS |
| VOICE QUALITY: PESQ SCORE | 4.5 | | 4.12 |
| VOICE QUALITY: RECEIVED PACKETS | 2644.0 PACKETS | | 2566.0 PACKETS |
| VOICE QUALITY: TRANSMITTED PACKETS | 2597.0 PACKETS | | 2643.0 PACKETS |
| VOICE QUALITY: AUDIO CLIP | 🎧🎧 | | 🎧🎧 |
| VOICE QUALITY: REFERENCE CLIP | | | |

FIG. 9B

VOICE QUALITY PROBE FOR COMMUNICATION NETWORKS

CROSS-REFERENCES TO RELATED APPLICATIONS

This application claims priority to U.S. Provisional Application Ser. No. 61/325,014, filed 16 Apr. 2010, which is incorporated herein by reference in its entirety.

BRIEF DESCRIPTION OF THE INVENTION

Embodiments emulate agents in a contact center, or enterprise, that initiate communication sessions to each other over communication networks and measure data quality using one or more metrics. The communication sessions can be used to place voice and video calls. Examples of communication networks used to place the communication sessions include Internet Protocol (IP) networks and hybrid networks including more traditional telephony components. The data collected by the emulated agents is sent to a monitoring server. The monitoring server and the emulated agent behavior can be configured and scheduled via a web interface. In addition, the web interface provides the user with detailed reports, performance summaries, and visualizations of data collected, further enabling the user to troubleshoot a contact center or enterprise over a variety of communication networks.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK.

Not applicable.

BACKGROUND OF THE INVENTION

Voice Over IP (VOIP) is a family of technologies that enable the transmission of voice communications over the Internet. VOIP uses well known Internet protocols and VOIP telephony protocols to transmit voice data. Examples of Internet protocols used by VOIP include the Transmission Control Protocol (TCP) and the Real-time Transport Protocol (RTP). Examples of VOIP telephony protocols include the Session Initiation Protocol (SIP), the H.323 standard, and the Skinny Call Control Protocol (SCCP), which is owned and defined by Cisco Systems, Inc.

Many monitoring solutions attempt to provide voice quality metrics by passively monitoring Internet Protocol (IP) Packet Metrics traversing the network. Such solutions involve hardware and/or software components that sit on the network and monitor data traffic as that traffic flows through the network. These solutions are accordingly limited to whatever happens to be traversing the network at any given time, which may not give the entity performing the monitoring an adequate sense of how the network and its various components are really performing. Because of the passive nature of such solutions, they are only capable of performing Mean Opinion Scores (MOS) tests on the monitored data and cannot perform Perceptual Evaluation of Speech Quality (PESQ) tests, which would require a known transmitted prompt to be compared to the received prompt or to a reference prompt.

PESQ is an existing family of standards used within the telecommunications industry comprising a test methodology for the automated assessment of speech quality as experienced by a user of a telephony system. PESQ is a full reference algorithm which can compare each sample of the reference signal, from the speaker side, to each corresponding sample of the degraded signal, on the listener side. Specifically, PESQ analyzes the speech signal sample-by-sample after a temporal alignment of corresponding excerpts of reference signals and test signals. PESQ results usually model Mean Opinion Scores (MOS).

Other attempts at providing voice quality metrics have limited functionality by only working within specific infrastructures instead of working in any telephony environment. For example, such solutions are only capable of performing tests within an internal network, but are not capable of performing calling tests from outside of the network into the network or from inside of the network to outside of the network.

BRIEF DESCRIPTION OF THE SEVERAL VIEWS OF THE DRAWING

FIG. 3A illustrates an available profiles window accessible via the web interface application in accordance with an embodiment;

FIG. 4A illustrates an add monitor window accessible via the web interface application in accordance with an embodiment;

FIGS. 8A and 8B illustrate an embodiment of a timeline for demonstrating metric performance of a Voice Quality Probe and a table of corresponding transactions resulting in the timeline; and FIGS. 9A and 9B illustrate an embodiment of a different metric performance timeline and corresponding metric table where one call during the timeline suffered from a quality issue.

DETAILED DESCRIPTION OF THE INVENTION

Figure 1:
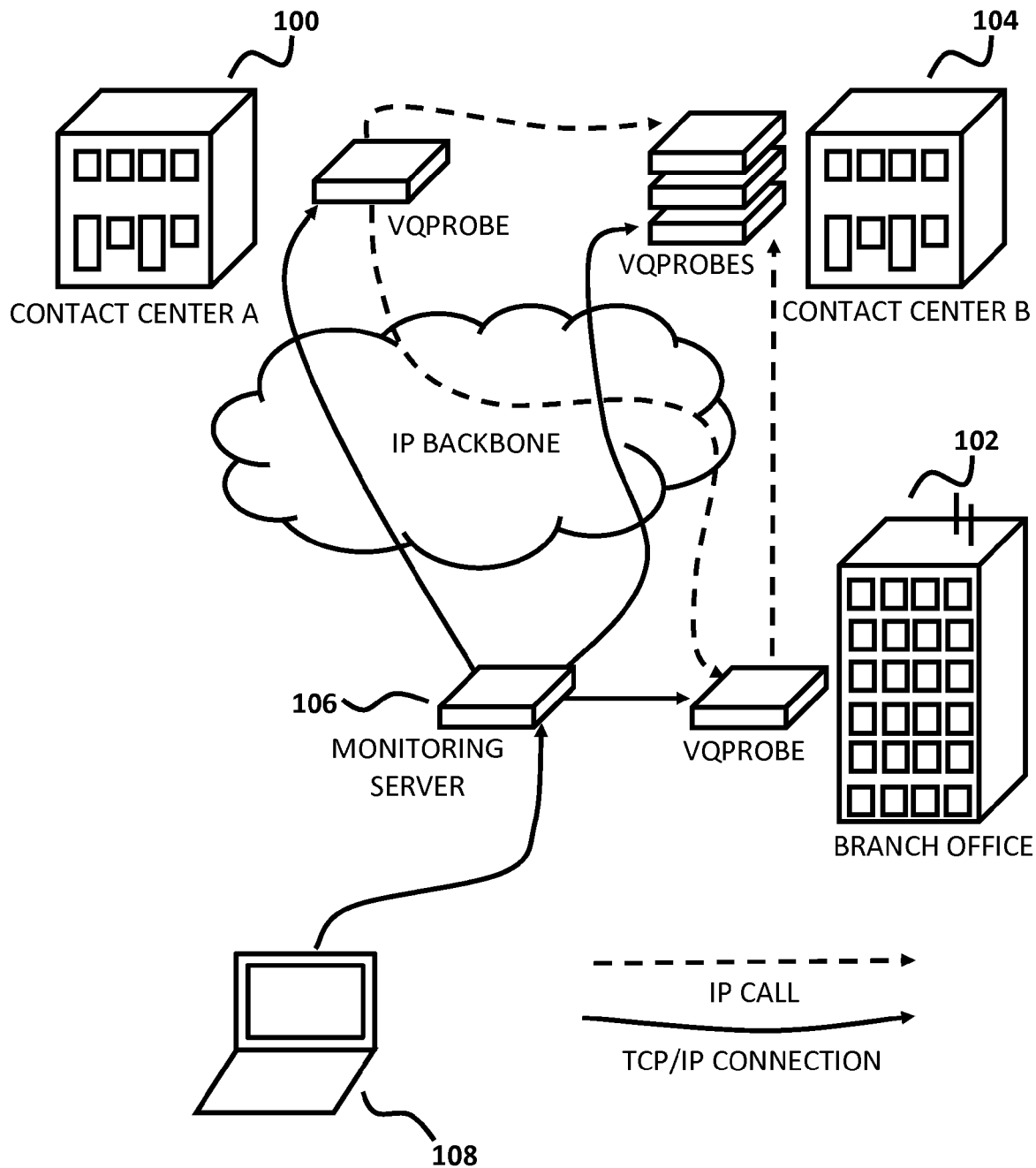
FIG. 1 illustrates a high level diagram of the deployment of Voice Quality Probes in various contact centers in accordance with an embodiment.

Embodiments emulate agents in a contact center, or enterprise, that initiate communication sessions to each other over communication networks. The emulated agents measure the quality of data transmitted over the communication networks using a plurality of metrics. The communication sessions can be used to at least place voice and video calls.

In one embodiment, the emulated agents actively place and receive voice calls to and from each other for the purpose of measuring one or more voice quality metrics associated with the calls. Voice quality can be measured using the PESQ/P.862.1 algorithm. The emulated agents place actual voice calls using the same communication paths used by actual customers calling a contact center. In addition, the emulated agents can place calls using the same paths used for internally placed calls in the contact center or the enterprise. However, since a large call center or enterprise may require many hundreds of active emulated agents, it may be desirable to combine the active agents described herein with passive monitoring tools to extend the form of testing that can be done in a practical manner.

The emulated agents can also place video calls to each other for the purpose of measuring video quality metrics associated with the video calls. Using alternative communication protocols, the quality of data transmitted within communication networks can be measured using a plurality of metrics.

Embodiments can also provide bi-directional voice quality for a voice call. Bi-directional voice quality is measured by having emulated agents listen to the same voice call prompt, with each emulated agent providing a voice quality score based on the listened prompt, and with the scoring by each emulated agent done independently. For example, a first emulated agent plays a prompt to a second emulated agent. The second emulated agent listens to the prompt and scores the voice quality of the prompt using PESQ or using an alternative set of metrics. Next, the second emulated agent plays the same prompt to the first emulated agent. The first emulated agent listens to the prompt and scores the voice quality of the prompt using PESQ or using an alternative set of metrics. From hereon, embodiments of the emulated agents shall be referred to as Voice Quality Probes (VQ Probes).

A VQ Probe leverages, builds on and extends active voice quality measurement methods incorporated into various existing products, such as the HAMMER™ FXIP and HAMMER G5 test engines, developed by EMPIRIX, Inc. (EMPIRIX). Aspects of the HAMMER test engines and ONESIGHT software, as further described below, are described in U.S. Pat. Nos. 5,572,570, 5,835,565, 6,091,802, 7,447,158 and 7,505,418, which are herein incorporated by reference in their entirety. The HAMMER G5 test engine is a flexible and scalable, multiprotocol and multi-media IP test platform used to verify the functionality, reliability and quality of IP network communication devices. The HAMMER FXIP test engine is also a multi-protocol and multi-media test platform, but it is used to test the reliability and quality of time-division multiplexing network communication devices.

The VQ Probe is easier to configure and use than the HAMMER G5 and the HAMMER FXIP test engines. In addition, the VQ Probe adds a number of features compared to the HAMMER G5 and the HAMMER FXIP products. If the VQ Probe is integrated into a monitoring server, such as the ONESIGHT software also developed by EMPIRIX, then the VQ Probe inherits many of the features of the monitoring server or ONESIGHT software, such as better reporting and email alerts. However, in contrast to ONESIGHT and other monitoring servers, the VQ Probe can also work in any telephony environment. Embodiments of the VQ Probe are not limited to interacting with the ONESIGHT software.

VQ Probes can be configured to perform Class 5 tests, and as such, can measure voice quality or changes in voice quality as calls are put on hold, as calls are forwarded to other VQ Probes, as other operations that redirect calls internally within a contact center or enterprise are performed, or as calls are placed to phones outside of the contact center or enterprise, or as calls are received from phones outside of the contact center or enterprise. For example, a contact center may continuously drop calls whenever outside calls are received and transferred within the internal communication channels of the contact center. The VQ Probe can identify such issues and allow an administrator to troubleshoot the problem.

The VQ Probe can be installed on a server or a workstation without any dependencies on any other software or hardware, aside from a monitoring server. Monitoring servers are further explained below. In addition, the VQ Probes can be installed anywhere inside any voice network. Once installed, the VQ Probe can register as a phone extension on an IP-PBX, a business telephone system designed to deliver voice or video over a data network, or as a phone interoperating with the Public Switched Telephone Network. Once registered, the VQ Probe can place monitoring calls to other VQ Probes or to a VOIP call generator, such as the EMPIRIX HAMMER G5 test engine. VQ Probes can call any other VQ Probe located anywhere in a voice network. When monitoring calls, as further described below, the VQ Probe measures the bi-directional voice quality using industry standard voice quality scoring algorithms, such as the PESQ algorithm. In addition, the VQ Probe measures network related call metrics such as jitter, round trip delay, lost packets, out of sequence packets, duplicate packets, received packets, and transmitted packets. Embodiments of the VQ Probe can also emulate busy signals, the termination of a call or the dropping of a call.

The actual reference audio clips or prompts used by the VQ Probes to identify voice quality issues can be recorded by a user. For example, a user may record reference audio clips with different levels of noise, different types of noise, and of differing lengths. The user can also select reference prompts comprised of pre-recorded voice messages. The use of user-created prompts enables a wider range of voice quality issues to be identified, a feature not provided by prior art solutions. In addition, it enables a user to customize the selection of reference prompts in accordance with the characteristics of the communication network.

In an embodiment, a web-based interface application, including a set of dashboards and reports, allows users to analyze data generated by the VQ Probes. Default reports focus on the voice quality of transactions. Reports can include successful and failed voice transaction calls, voice quality metric comparison, voice quality monitor summary, lowest PESQ score gauge, voice quality metric performance gauge, among other possible reports and statistics. Alternative embodiments can include reports that focus on one or more properties of interest to a user. For instance, a user interested in determining the bandwidth consumed by VOIP calls, can view reports associated with bandwidth consumption that include details of packet transmission. If such reports do not exist by default, the web-based interface enables a user to filter all data gathered to create reports including only the data of interest to the user. Further details related to reports will be further discussed below.

An embodiment records the actual voice quality calls made by the VQ Probes using audio diagnostics. A recorded audio clip of the monitored call can be attached to each voice quality call transaction. In addition, the source (originate) and destination (answer) call legs can be separately recorded for comparison between themselves or separate comparison to a reference prompt. For example, a user troubleshooting a contact center may identify that a particular VQ Probe continuously gets low voice quality scores. The user may then listen to the recorded audio clips for all of the calls made by that particular VQ Probe to help determine the cause of the low voice quality scores emanating from that VQ Probe.

One embodiment uses user recorded prompts to test the communications network in different ways, such as for a particular type of noise or signal quality. Another embodiment uses standardized prompts that are known to test the communications network with voiced words that only come through clearly in a quality communications network and test the full quality of voice annunciation over the network, such as the following International Telecommunications Union standard prompts:

They worshipped wooden idols.
You will have to be very quiet.
There was nothing to be seen.
I went a minute with the inspector.
Did he need any money?

When a known prompt is used, it is known when the transmitted prompt is sent and when the received prompt is received, and it is known exactly what was said. As such, prompts transmitted between VQ Probes over a communications network can be more readily compared to the original reference prompt, such as through use of PESQ, to determine the differences between them.

For example, the prompt transmitted from a first VQ Probe and received by a second VQ Probe, can be compared by the second VQ Probe to a reference prompt. Comparing a transmitted prompt against a reference prompt is used to identify how the traversal of the prompt over the communications network affects the quality of the original prompt. Once the second VQ Probe has analyzed the received prompt by using one or more algorithms and by computing various metrics, the second VQ Probe can then proceed to transmit the same reference prompt to the first VQ Probe. By transmitting the same reference prompt between two VQ Probes, the transmitting and receiving ends are tested equally. Comparisons to a reference prompt help to identify the overall quality of a communications network connection and where problems may reside. For example, if the received prompt does not compare favorably with the reference prompt, there may be a problem with either the transmitting end, the receiving end, or both the transmitting end and the receiving end.

Embodiments of the VQ Probe are not limited to analyzing a received prompt immediately upon receipt of the prompt. Instead, one or more reference prompts may be transmitted between two VQ Probes, in sequential order or in alternating order, with the analysis deferred until all of the reference prompts have been transmitted. For example, the first VQ Probe can transmit a first reference prompt to the second VQ Probe. The second VQ Probe receives the first reference prompt, and transmits the first reference prompt to the first VQ Probe. The first VQ Probe then receives the first reference prompt, and proceeds to transmit a second reference prompt to the second VQ Probe, and so on, with analysis performed after the successive transmission of the reference prompts between the first and the second VQ Probes. Alternatively, the first VQ Probe can transmit a plurality of prompts to the second VQ Probe, introducing short pauses or a distinct noise signal between the transmitted prompts. Once the first VQ Probe has transmitted all of the prompts and the second VQ Probe has received all of the transmitted prompts, the second VQ Probe can proceed to transmit the same plurality of prompts, or a different plurality of prompts, back to the first VQ Probe. Introducing the short pause or a distinct noise signal would enable the VQ Probes to segment a single transmitted message into the constituent reference prompts.

An embodiment supports various protocols and codecs, such as SIP, SCCP, H.323, UNIStim by NORTEL, and other VOIP/telephony protocols that currently exist or that may be developed in the future. An embodiment can also support narrowband codecs, such as G.711, G.723, and G.729, and other codecs that currently exist or may be developed in the future.

Embodiments described herein provide a single, comprehensive perspective on the operation of a contact center or enterprise. One or more monitors are used to gain an in-depth analysis of voice transactions, call statistics, and telephony systems. Embodiments also provide a multi-layer view that enables an administrator of a contact center to proactively identify problems affecting customers, such as interactive voice response (IVR) problems, routers, switches, traffic loads, etc., and quickly troubleshoot them.

Embodiments use "Data Collectors" to collect information from various computers and applications. A Data Collector comprises a process that runs on a computer and passes information to a monitoring server via a TCP connection. The monitoring server gathers data from one or more Data Collectors and performs an analysis of that data. The monitoring server can use a database to store and organize the data received from Data Collectors. Alternatively, the monitoring server can store and organize the data in one or more files within one or more folders or directories. For example, all of the data associated with a particular VQ Probe may be stored within a table in a database, within a single file, or within various files in a folder or directory associated with that particular VQ Probe. In alternative embodiments, the Data Collection can pass information to a monitoring server via UDP, SCTP, or by using some other suitable transport layer protocol or application layer protocol.

After the monitoring server receives the data from the Data Collector and analyzes the data, the monitoring server then presents a user with numeric and visual summaries that can be used to troubleshoot a quality or system issue within a contact center environment. Some of the examples of information collected by Data Collectors include memory usage, pinging a network device, requesting a Uniform Resource Locator (URL) to verify that it is available, etc.

The VQ Probe is a new type of Data Collector that can place VOIP calls, receive VOIP Calls, and calculate the voice quality between two endpoints in a variety of ways fully within and partially within a communications network. The VQ Probe operates with a monitoring server. The data collected by the VQ Probe is sent to the monitoring server, and it is through the interface of the monitoring server that a user can view data analytics, view reports, view other performance and test summaries, and listen to recorded audio clips associated with a voice quality call transaction. In an embodiment, the interface of the monitoring server also includes options for recording the actual reference clips used to identify voice quality issues. Alternatively, the user can select the reference clips to use from a plurality of pre-recorded reference clips, or can randomly select a reference clip from the plurality of pre-recorded reference clips. If more than one monitoring server is used, each monitoring server can be accessed via its own interface, such as through a web interface. Alternatively, a user can access a plurality of monitoring servers via a single web interface application, enabling the user to configure and deploy a plurality of monitoring servers and a plurality of VQ Probes within a centralized interface. In addition, the single web interface application can further enable the user to view and analyze the data collected by the plurality of monitoring servers.

Embodiments of the web interface application can also be used to enable the user to schedule the voice quality testing between any two VQ Probes. Scheduling options can include the ability to specify in a calendar when voice quality testing is to be performed per hour, per day, per week, per month, etc.

FIG. 1 illustrates a high level diagram of the deployment of VQ Probes in various contact centers in accordance with an embodiment. A user can install VQ Probes at various locations within and outside of one or more contact centers. Once installed, the VQ Probes are configured to call each other as desired. Every VQ Probe need not be connected to every other related VQ Probe. In embodiments, the user can manually specify links between VQ Probes, with each link representing VQ Probes that call each other for testing voice quality. In one embodiment, links between a plurality of VQ Probes can be automatically created to ensure every VQ Probe is connected to every other VQ Probe, to ensure that every VQ Probe is connected to no more than two other VQ Probes, to ensure that every VQ Probe within a contact center is connected to at least one VQ Probe outside the contact center, etc. Once links have been automatically created, the user can manually delete links, add links, or modify links between VQ Probes. Once a graph of the various VQ Probes, consisting of the plurality of VQ Probes and the connections between the VQ Probes, has been established, that graph can also be updated after a pre-defined condition or after a predetermined period of time. For example, the graph of VQ Probes can change from a first arrangement to a second arrangement every other day, or every other hour, or every other week, etc. Alternatively, the graph can change from a first arrangement to a second arrangement in response to all VQ Probes receiving at least a MOS score of 4.0 a number of times, receiving a MOS score of 4.0 a consecutive number of times, a number of packets dropped being below a threshold a number of different times or a number of consecutive times, the PESQ score averaging above a threshold after a number of tests, etc. The manner in which links are created between VQ Probes can be specified by the user via conditional statements or via a plurality of rules. The manner by which the graph of VQ Probes can be updated can similarly be subjected to conditional statements or a plurality of rules created by the user.

As illustrated in FIG. 1, one or more VQ Probes can be installed in a single contact center or enterprise. For example, both Contact Center A 100 and the Branch Office 102 have a single VQ Probe installed respectively, but Contact Center B 104 has multiple VQ Probes installed. The VQ Probes place IP calls (such as SIP, H323, etc.) to each other via an IP connection, as illustrated by the dashed lines between VQ Probes. For example, the VQ Probe from Contact Center A 100 can make IP calls to the VQ Probes of Contact Center B 104 and the VQ Probe of the Branch Office 102, and vice versa. The VQ Probes of Contact Center B 104 can also place calls to each other using the internal communication channels of Contact Center B 104.

While embodiments described herein are described in reference to VOIP calls, VQ Probes can also place video calls to each other to further test the communication network integrity. In addition, embodiments can also test voice conference calls between three or more VQ Probes and video conference calls between three or more VQ Probes.

In further reference to FIG. 1, the solid lines represent TCP/IP connections between the VQ Probes and the monitoring server 106. As previously discussed, while an example of a monitoring server 106 is the ONESIGHT monitoring server, embodiments are not limited to the ONESIGHT monitoring server. The voice quality scores, reports, and other results collected and generated by the monitoring server are accessible to a user via a TCP/IP connection through a web application available through computer 108. However, as noted above, embodiments are not limited to a web application or to a TCP/IP connection to access the data and reports collected and generated by the monitoring sever 106. Moreover, the monitoring server can be configured to alert the user via email, or via an alternative text or voice communication, when a voice quality score falls below a threshold, wherein the threshold can be set and customized by the user. In this way, the user can monitor the voice quality on their voice network and be informed immediately when a problem is identified. The monitoring server can also be configured to perform an action when a condition is met. For instance, if the voice quality scores for two VQ Probes fall below a threshold, then the monitoring server can perform the action of routing calls via an alternative router or switch.

As stated above, embodiments of the VQ Probe perform bi-directional voice quality tests between a plurality of VQ Probes. For example, VQ Probe A sends a TCP SIP Invite message to VQ Probe B. VQ Probe B answers the Invite message and the call is established. VQ Probe A plays a prompt by sending a prompt to VQ Probe B using RTP. VQ Probe B listens to the prompt and scores it using PESQ. The VQ Probe B then plays the same prompt; VQ Probe A listens to it and also scores it using PESQ. In an alternative embodiment, VQ Probe B plays a different prompt than the prompt received from VQ Probe A. VQ Probe A may also score the prompt using a different set of metrics than those used by VQ Probe B. In addition, the bi-directional voice quality test can be performed using a protocol other than SIP, such as H.323, SCCP, UNIStim, or other stimulus protocols used for placing voice and video calls over an IP network.

Figure 2:
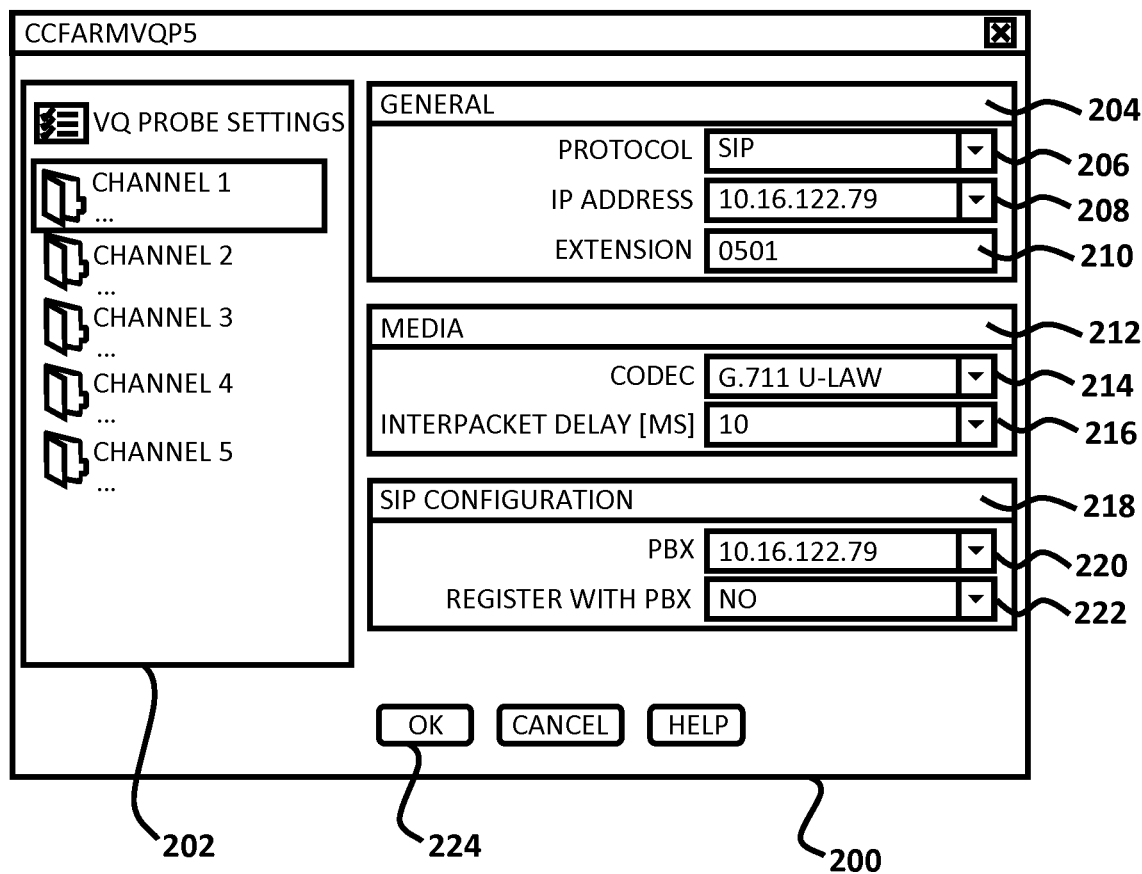
FIG. 2 illustrates a display of an embodiment of a web interface application used to configure a Voice Quality Probe.

Once a VQ Probe has been installed, such as within a customer network, the user can then configure the VQ Probe, such as by creating one or more channels that the VQ Probe can use, through a web interface application, or other tool, such as the embodiment of an interface illustrated in FIG. 2. The interface embodiment illustrated in FIG. 2 includes a maximum of five modifiable channels, but there is no limit as to how many channels could be used. A channel establishes the particular configuration for the VQ Probe, which can include a name, a protocol to use, an IP address, an extension, a codec and other configuration elements. The monitoring server to which the VQ Probe should connect can also be part of the configuration elements. If the user enters the name or some other identifier associated with a monitoring server, then the networking infrastructure can look up the corresponding IP address of the monitoring server based on the name or identifier entered by the user.

As noted above, the VQ Probe can be configured through an Internet web interface application, which allows users to create monitors for a plurality of voice quality transactions. After the VQ Probe and the voice quality monitors are configured, the VQ Probe can be used to perform bi-directional voice quality monitoring in the manner specified by the user, or in accordance with one or more default settings. It is noted that embodiments are not limited to an Internet web interface. In embodiments, the VQ Probe can be configured via a desktop application, a mobile application, or even via a command line terminal remotely connected to the monitoring server.

FIG. 2 illustrates a display or panel 200 of the web interface application (the application itself is not shown) used to configure a VQ Probe. The panel 200 of the application allows the user to configure the parameters that will be used to establish a VOIP call. The display 200 includes a number of subpanels for configuring the VQ Probe in various ways. In subpanel 202, the user can select between five or more different channels, each of which allows the user to specify some general conditions in general subpanel 204 when using that particular channel. Options available under the general subpanel 204 include the choice of protocol (protocol field 206) to use when placing voice calls, the IP address of the VQ Probe (IP address field 208), and the extension of the VQ Probe (extension field 210). Again, while FIG. 2 illustrates five available channels, a different number of channels may be presented to the user for configuring the VQ Probe.

The IP address in the IP address field 208 can be manually entered by the user. Alternatively, the IP address field 208 can consist of a list, a dropdown list, a dropdown menu, or some other widget used to present one or more IP addresses to be used by the VQ Probe. The IP address field 208 can also keep a history of previously entered IP addresses, with the history of previously entered IP addresses used to populate a list displayed whenever the user edits the IP address field 208. This would be especially useful if the IP addresses of VQ Probes were reused frequently. As noted above, the user can also enter a name or an identifier associated with a VQ Probe in the IP address field 208, with the corresponding IP address for the VQ Probe identified by the networking infrastructure. The protocol field 206 can consist of a textbox manually filled out by the user, or it can consist of a dropdown menu or dropdown list populated with protocols supported by the network or protocols to be tested.

A media subpanel 212 includes options allowing the user to select the codec (codec field 214) to be used when transmitting the media and the interpacket delay in milliseconds (delay field 216). The delay field 216 can consist of a list of default values or it can consist of a simple text entry box. The delay field 216 can also include a randomized option, which picks a random number for the interpacket delay, in milliseconds and within certain limits determined by the selected codec, to be used whenever a VQ Probe is about to make a test call.

The SIP configuration subpanel 218 enables the user to identify the IP address of the PBX (pbx field 220) and whether it is necessary to register the VQ Probe with that particular PBX (register field 222). Similar to the IP address field 108, the pbx field 220 can be populated in a variety of ways. For example, the web application can poll the network for a list of the IP addresses of the PBX systems in the network. Alternatively, a default list of IP addresses can be presented, or the user may manually enter the IP address of the PBX system. The user can also enter a name associated with the PBX system, with the network infrastructure looking up the corresponding IP address based on the name entered by the user.

Many of the options displayed in panel 200 are dependent on other user selections made in panel 200. For example, if a user selects a particular protocol, the user may be subsequently presented with additional options specific to the selected protocol. Different selections can result in the presentation of different options. In FIG. 2, SIP is the selected protocol, and a corresponding SIP configuration panel 218 is displayed at the bottom of the panel 200. For SIP, the user specifies the IP address of the PBX and whether to register with the PBX. The options for other protocols will depend on the actual protocol selected. When the user presses the OK button 224, the selected information is passed to the VQ Probe, at which point the VQ Probe is ready to start placing and receiving calls.

Once the VQ Probe has been configured, the user proceeds to create a monitor. A monitor watches a certain piece of data—including voice quality and network related call metrics. Specifically, a monitor is an instance of a profile. A profile enables a user to specify a set of metrics, one or more alerts associated with the set of metrics, and a set of actions associated with one or more metrics or with the one or more alerts. The profile can then be used to create and configure a plurality of monitors. The created monitors perform the metrics, send the alerts, and perform the actions associated with the corresponding profile.

As noted above, a monitor is created by using a profile. A profile specifies the metrics or data to be gathered and analyzed by the monitor. FIG. 3A illustrates a profiles window 300 listing available profiles. A set of default profiles are provided to the user, but the user is given the option to create custom profiles by using the menu bar 302 options. For example, the user can add a new profile (using the "Add" option), clone an existing profile (using the "Clone" option), modify an existing profile (using the "Modify" option), delete an existing profile (using the "Remove" option), import one or more profiles from a file (using the "Import" option), or export one or more profiles to a file (using the "Export" option). While the profiles window 300 lists the name, user group, data sources, description, and type of each profile, the user can customize the fields displayed for each profile on the profiles window 300.

Figure 3B:
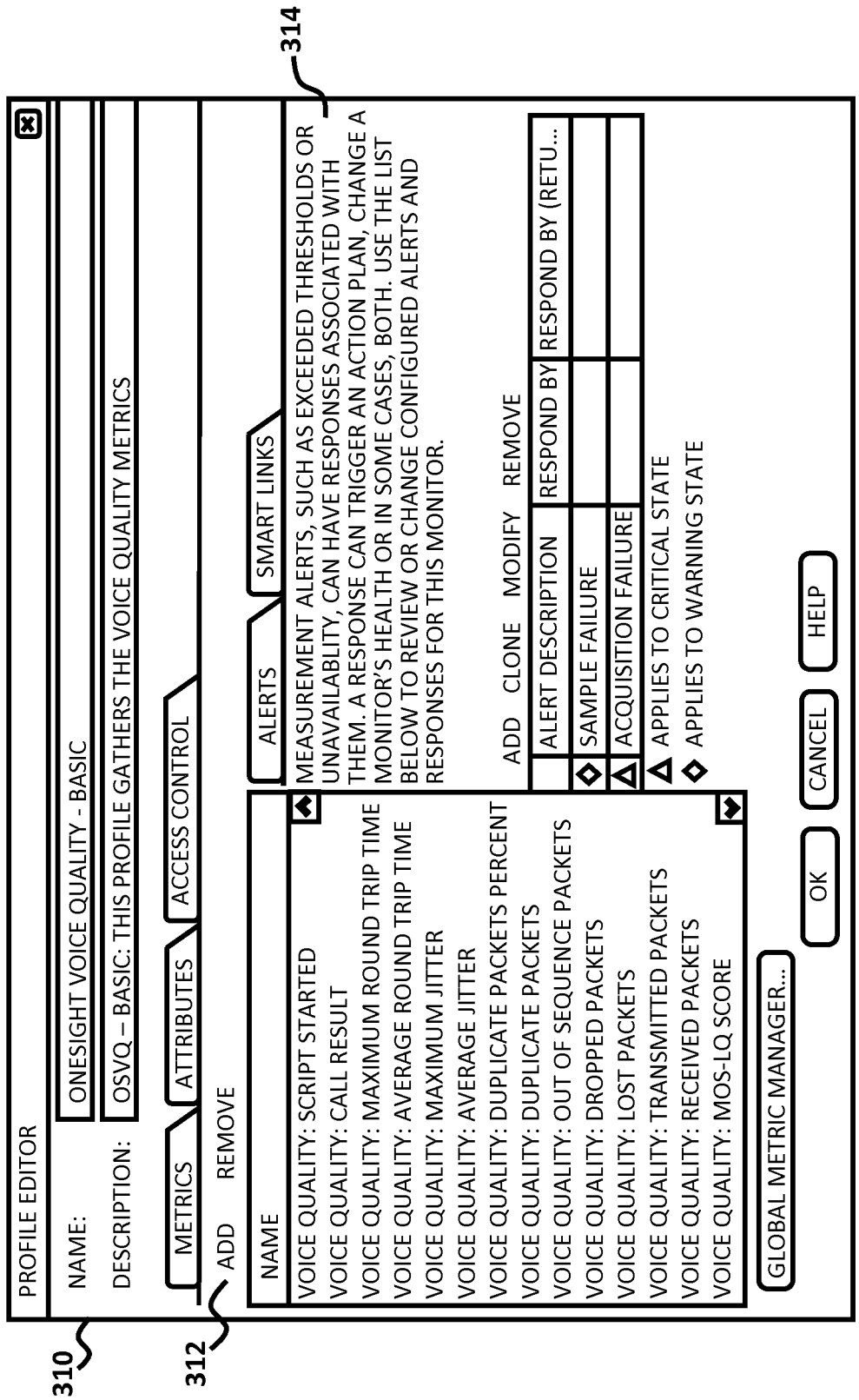
FIG. 3B illustrates a profile editor window accessible via the web interface application in accordance with an embodiment.

FIG. 3B illustrates a profile editor 310 that allows a user to create a new profile or to edit an existing profile. In particular, FIG. 3B illustrates a profile created to measure various voice quality metrics. Examples of voice quality metrics include the call result, the maximum/minimum/average round trip time, the maximum/minimum/average jitter, the duplicate packets percentage, the number of duplicate packets, the out of sequence packets percentage, the number of out of sequence packets, the dropped packets percentage, the number of dropped packets, the lost packets percentage, the number of lost packets, the total number of transmitted packets, the total number of received packets, the MOS-LQ score, and the PESQ score, etc.

The profile editor 310 enables the user to add and remove metrics from the current profile by using the metrics toolbar 312. The profile editor 310 further includes the ability to create alerts, via the alerts panel 314, associated with various threshold values of one or more metrics. Alerts can further trigger responses associated with the alerts. The response can trigger one or more actions that can be used to resolve the issue that triggered the alert, to inform the user with a corresponding report, or to perform damage control until the user or administrator has time to troubleshoot the system. Alerts can include sending a notification to a particular user, such as a system administrator, via text-based or voice messages. In addition, the alert can trigger the execution of a script or a sequence of steps used to resolve or mitigate the original issue. For example, if a switch is identified to be dropping packets, then the executed script or sequence of steps can reroute traffic by using a different switch until the switch flagged as the source of the problem is fixed.

Figure 3C:
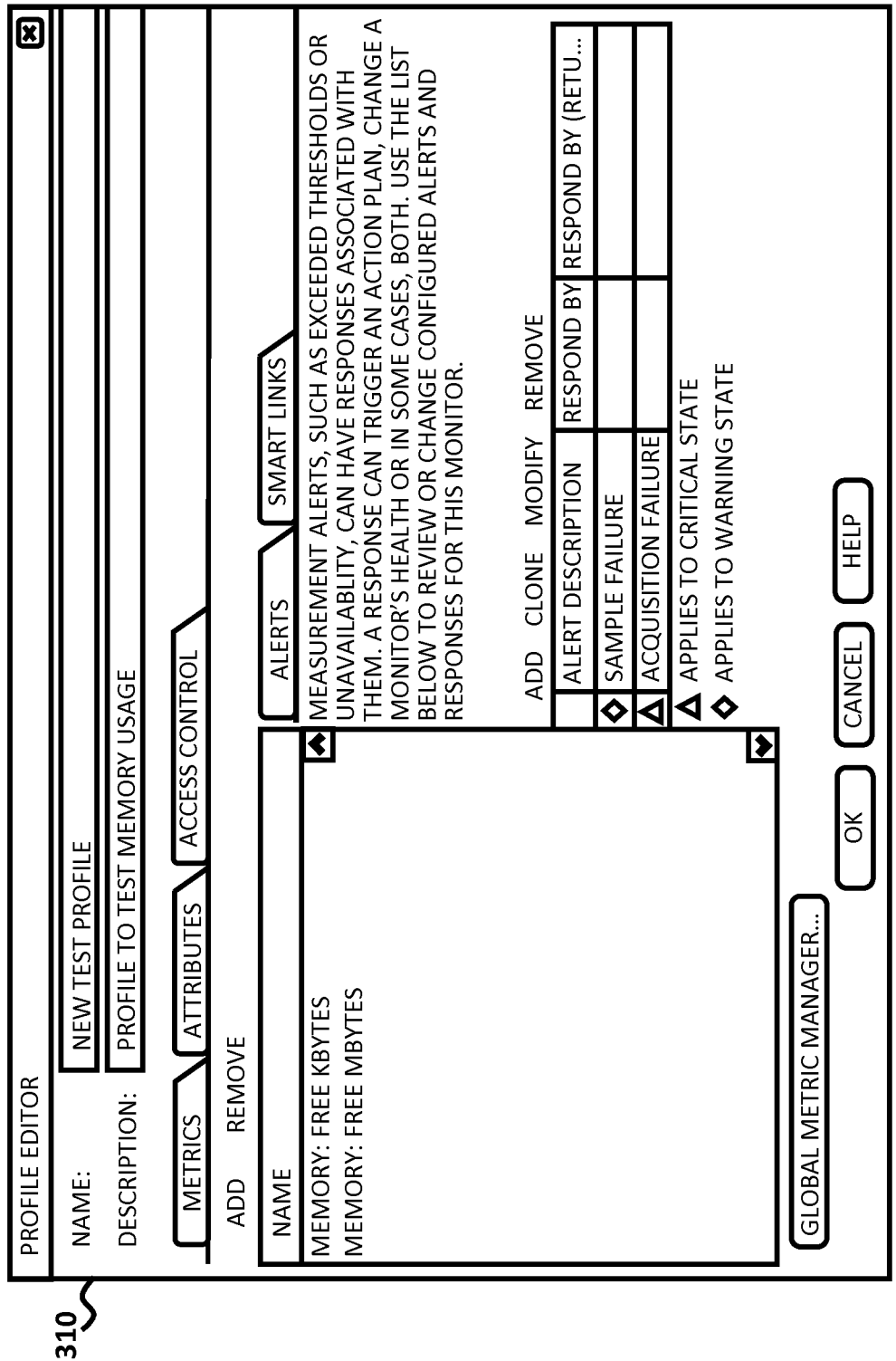
FIG. 3C illustrates a display of a new profile being created via the profile editor from FIG. 3B in accordance with an embodiment.

FIG. 3C illustrates an example of a new profile being created via the profile editor 310 for testing memory usage on a network component. In this example, the user has selected the metrics "MEMORY: FREE KBYTES" and "MEMORY: FREE MBYTES" from a list of available metrics. Had the user not been able to find the needed metrics, then the user can create a new metric by various means, such as by using an application programming interface (API) of the web interface application or by creating a script with the necessary logic to compute the new metric. Once the user has finished editing the profile, the profile can be saved and subsequently used to create monitors.

In one embodiment, one or more profiles can include a set of pre-defined metrics (base metrics) and a set of user selected or user defined metrics. The use of a set of base metrics would enable each profile to compute a key set of metrics, while the use of the user selected metrics would still enable the user to customize the types of metrics computed by the VQ Probes. Alerts and responses/action plans can be associated with one or more metrics from the set of base metrics and with one or more second metrics from the set of user selected metrics.

In an embodiment, the web based application can also enable the user to edit the set of base metrics. For instance, the user may find that a particular metric from the set of base metrics does not provide useful information as originally thought, or the particular metric may be too computationally intensive. In such a case, having the ability to customize the set of base metrics would enable the user to remove one or more metrics from the set of base metrics. If necessary, the web based application can further enable the user to edit the actual settings associated with each metric, either from the set of base metrics or user-defined metrics. For instance, the MOS-LQ score and the PESQ score can be configured according to the user's needs and the type of communication network being tested.

Figure 4B:
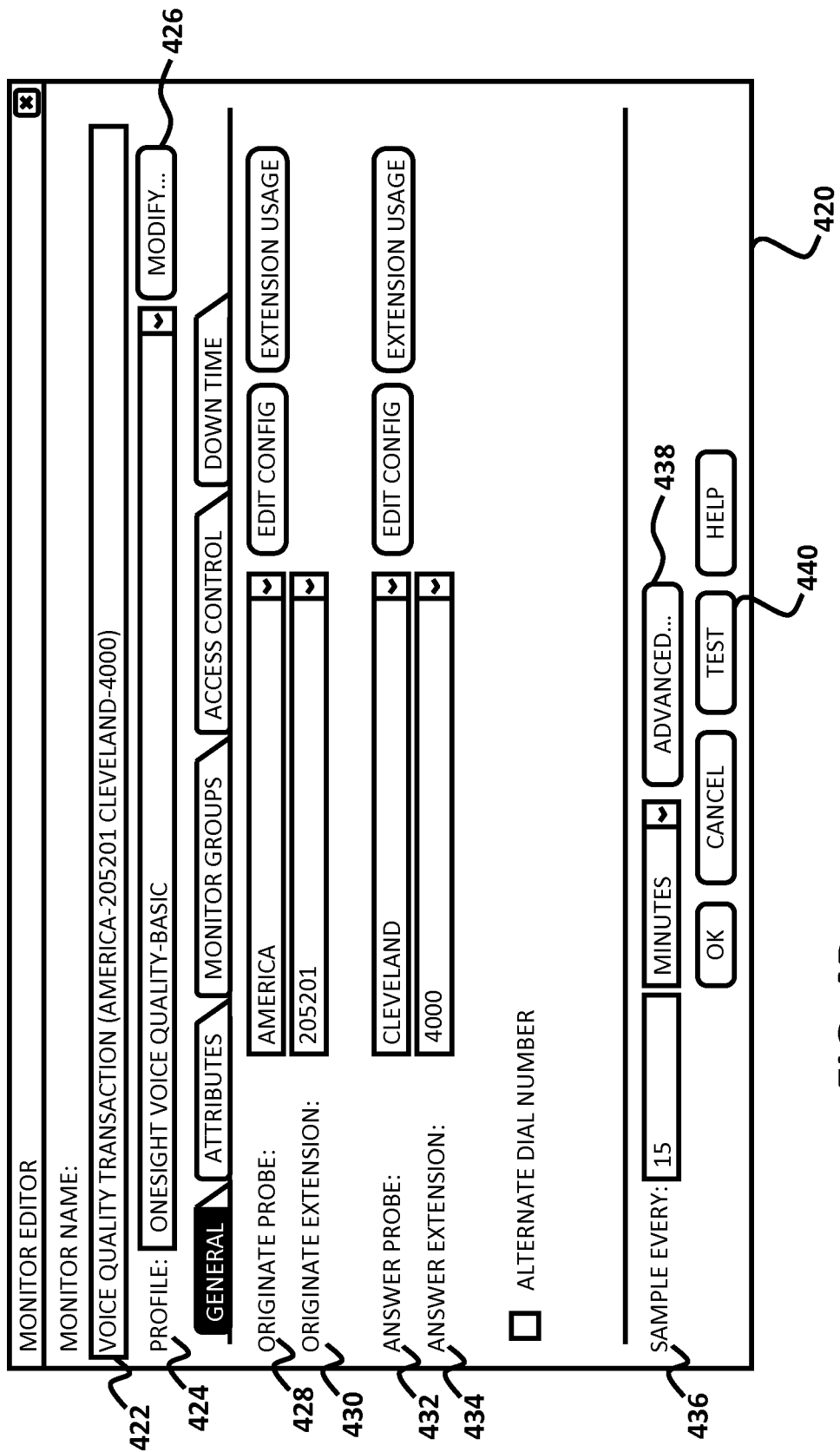
FIG. 4B illustrates a monitor editor window accessible via the web interface application in accordance with an embodiment.

FIG. 4A illustrates an add monitor window 400 including a list of available profiles 402 and enabling the user to quickly browse through the profiles. Whenever a profile is selected from the list of profiles 402, such as the selected new test profile 404, corresponding information associated with the selected profile 404 is displayed in profile details panel 406 and in the profile metrics panel 408. The profile details panel 406 can display the profile's name, the profile's description, data sources examined by the profile, among other details. The profile metrics panel 408 can list the metrics associated with the profile, along with alerts associated with the metrics. As the number of available profiles can be large, with each of those profiles being unique and having different metrics and properties associated with them, having information displayed for each profile enables a user to quickly explore profiles and select the appropriate profiles without having to pick the profile solely based on what the user remembers about the profile's name. Once a profile has been selected, the user presses the next button 410, which redirects the user to the monitor editor window 420 illustrated in FIG. 4B.

Similar to the other windows and screens presented herein, the monitor editor window 420 from FIG. 4B is accessible through the web interface. The monitor editor 420 allows the user to assign a name 422 to the monitor being created. The profile field 424 displays the profile selected in the add monitor window 400 from FIG. 4A. In particular, FIG. 4B illustrates a Voice Quality—Basic profile. The user is given the option to modify the profile being used for the monitor being created by using the modify button 426. Pressing the modify button 426 displays the profile editor window 310 illustrated in FIGS. 3B and 3C, allowing to user to modify the current profile without having to close the monitor editor window 420.

FIG. 4B shows the options displayed when the "General" tab is currently selected (shown as highlighted in the background). The user has the option to select any of the other tabs to further customize the monitor. The other available tabs include Attributes, Monitor Groups, Access Control, and Down Time. The tabs present different editable settings for the monitor. All of the settings and attributes would preferably be set to a default value, thus saving the user time and allowing the user to change the values of settings and attributes only when necessary. For example, the Monitor Groups tab enables a user to associate the monitor being edited with an existing monitor group. Alternatively, the user has the option to create a new monitor group and associate the monitor being edited with the new monitor group. When creating a monitor group, the user can have the option to assign a name to the monitor group, include a brief description of the monitor group, and select one or more existing monitors to be added to the new group.

Monitor groups enable a user or administrator to organize and manage a plurality of monitors, and most importantly, organize and manage the data collected by the monitor group. For instance, a first monitor can track one or more metrics associated with packet transmission during VOIP calls. A second monitor can track one or more different metrics also associated with packet transmission during VOIP calls. The user can subsequently assign these two monitors to a packet transmission monitor group. Data and reports associated with each monitor from the packet transmission monitor group can subsequently be aggregated and presented to the user via the web interface application (also referred to as a dashboard).

In the example illustrated in FIG. 4B, the user has identified the originate probe 428 as the "America" VQ Probe, with an originate extension 430 of "205201", and has it calling answer probe 432, identified as the "Cleveland" VQ Probe, with an answer extension 434 of "4000". This particular monitor is configured to place a call every 15 minutes, specified via the sampling frequency fields 436. In other words, every 15 minutes the America VQ Probe will call the Cleveland VQ Probe, transmit data (such as a prompt), and measure the quality of the transmission. The advanced button 438 enables the user to specify more complex and advanced sampling frequencies. When the monitor is saved and enabled, the VQ Probe is initiated. The test button 440 is used to test the configuration of the monitor. The configuration is tested by performing a single actual call between the originate probe 428 and the answer probe 432. If the test fails due to an error, then the user is notified and allowed to further edit the settings of the monitor if necessary.

Figure 5:
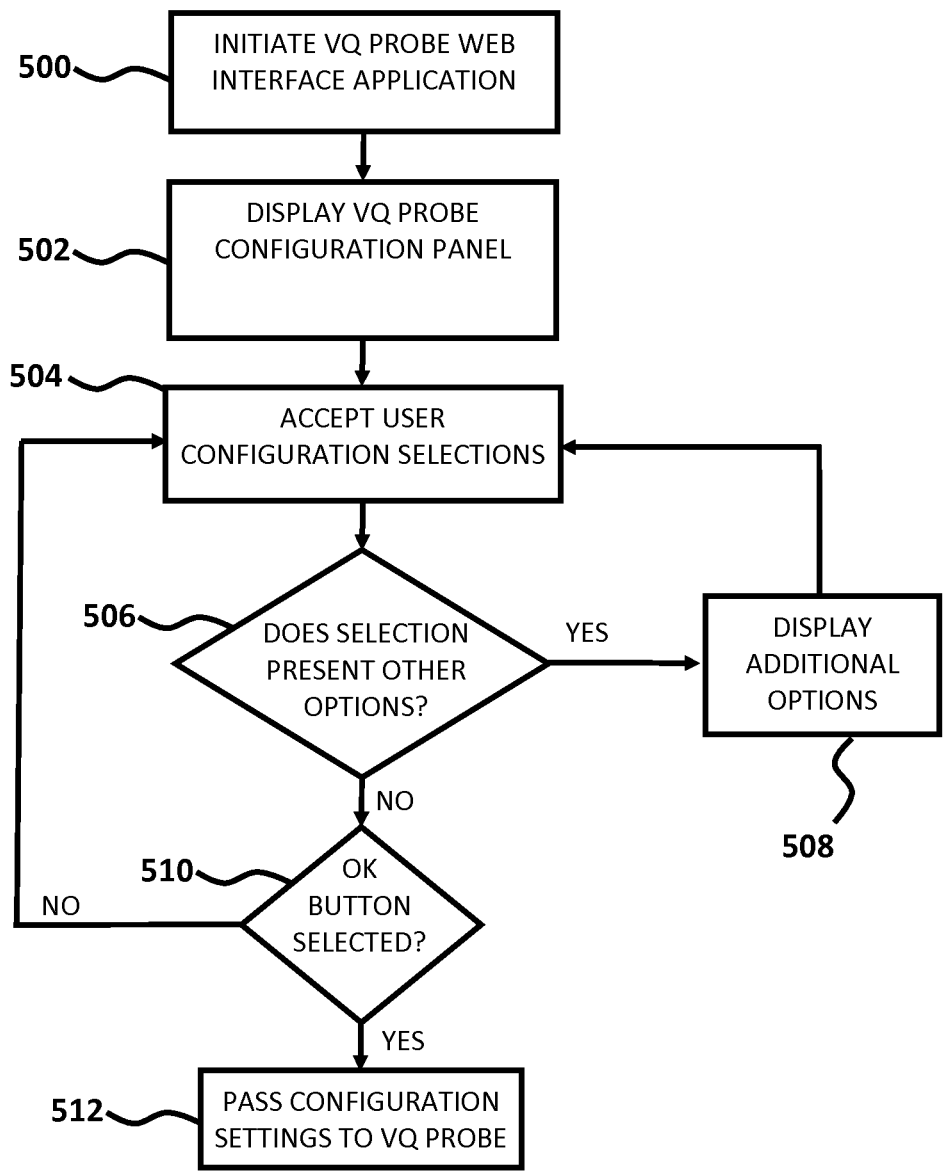
FIG. 5 illustrates a flowchart of the main steps associated with the web interface application of FIG. 2 in accordance with an embodiment.

FIG. 5 illustrates a highly simplified flowchart with the main steps associated with the web interface application from FIG. 2 used to configure a VQ Probe. Many additional steps and details could be included in the flowchart of FIG. 5 to further illustrate FIG. 2, but the flowchart of FIG. 5 has been simplified in order to demonstrate the order in which certain main steps should be performed. Step 500 initiates the VQ Probe web interface application. Step 502 displays to the user the VQ Probe configuration panel from FIG. 2. Step 504 accepts from the user configuration selections. For example, during step 504 the user may specify for channel 1 to use the SIP protocol, with IP address of 10.16.122.79, and an extension of 0501. As mentioned above, several options may only be conditionally displayed depending on the options selected by the user. For example, selecting a particular protocol may display options strictly associated with the selected protocol. Similarly, selecting a particular codec may display options strictly associated with the selected codec. Step 506 checks whether any of the user selections require other options to be presented to the user. If other options need to be presented to the user, then step 508 displays the additional options to the user. Step 510 checks whether the user has finished editing the VQ Probe settings and has selected the OK button. If the user has not selected the OK button, then the VQ Probe configuration panel continues to accept and wait for the user selections. Otherwise, if the user has selected the OK button, then step 512 sends the user settings to the corresponding VQ Probe.

Figure 6:
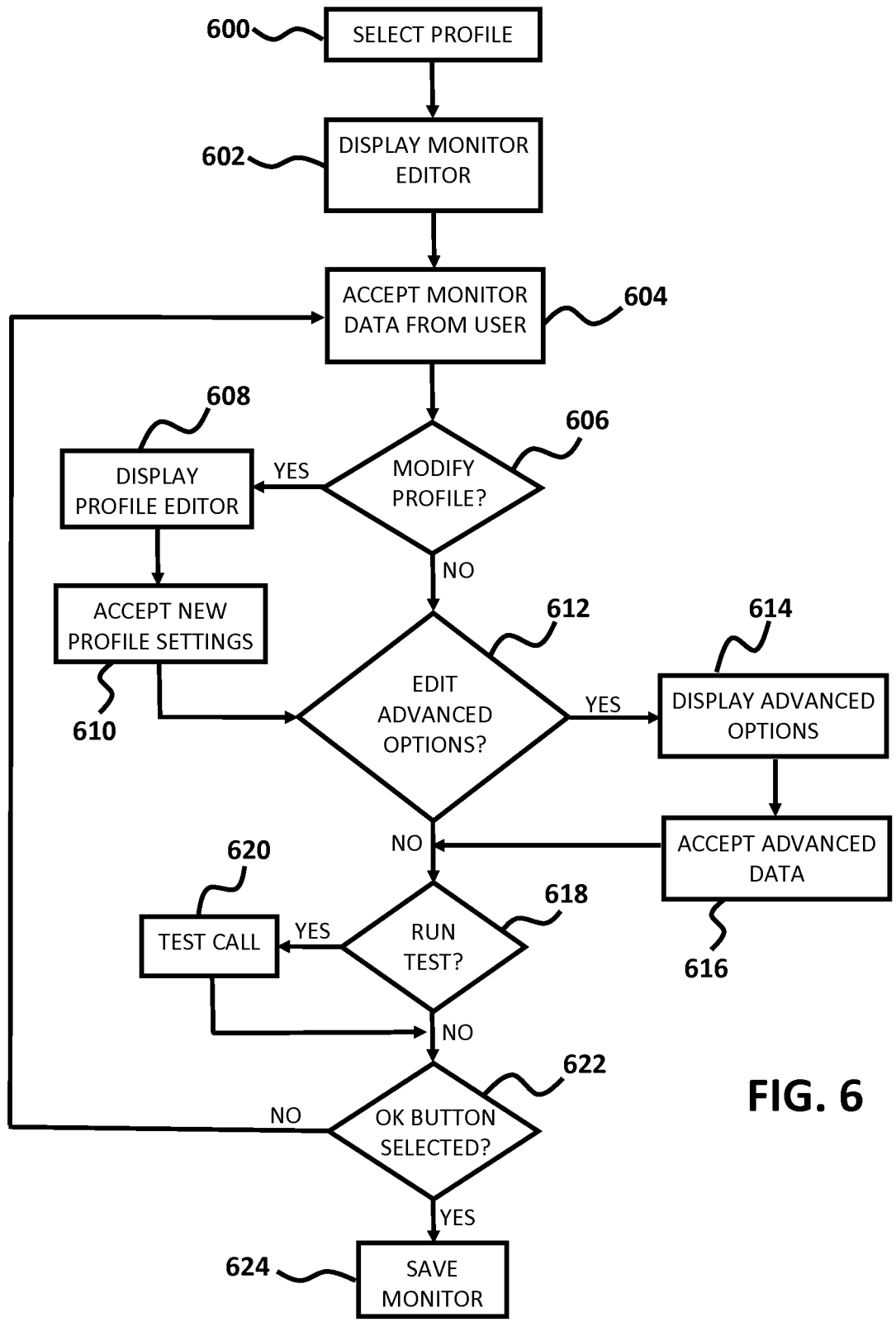
FIG. 6 illustrates a flowchart of the main steps associated with the monitor editor of FIG. 4B in accordance with an embodiment.

Like FIG. 5, FIG. 6 illustrates a highly simplified flowchart with the main steps associated with the monitor creation from FIG. 4. First, a profile is selected in step 600, associated with the selection in FIG. 4A. Step 602 displays the monitor editor illustrated in FIG. 4B. Step 604 accepts monitor data from the user, including the monitor name, the names and extensions of the originate VQ Probe and the answer VQ Probe, among other monitor settings. If necessary, the user is given the option to modify the profile being used for the monitor. Step 606 checks to see whether the user wants to modify the profile selected for the monitor. If the user selects the modify button 426, then the profile editor 310 is displayed in step 608, allowing the user to edit the profile settings. Any edits made to the profile settings are accepted on step 610, or discarded if the user decides to cancel the modification of the profile. For example, the user may decide to add an additional metric to the profile, and step 608 enables the user to edit the profile as necessary without having to close the monitor editor window 420 or having to restart the monitor creation process.

If the user does not wish to modify the selected profile, then step 612 checks whether the user wishes to customize the advanced options of the monitor. If the user selects the advanced options button, then step 614 displays the advanced options within the monitor editor 420 or within a different panel or window. As noted above, the advanced options can include but are not limited to customization of advanced sampling frequencies. Step 616 accepts any selections made by the user associated with the advanced options, or discards those selections if the user cancels any changes made. Step 618 checks whether the user wants to test the monitor settings, and if true then step 620 performs a single actual call between the two VQ Probes identified via the monitor editor 420. Step 622 checks whether the user has finished editing the monitor and has selected the OK button. If the user is not done editing, then the monitor editor 420 continues accepting monitor data from the user. Once the user has finished editing and selects the OK button, step 624 saves the monitor.

Figure 7A:
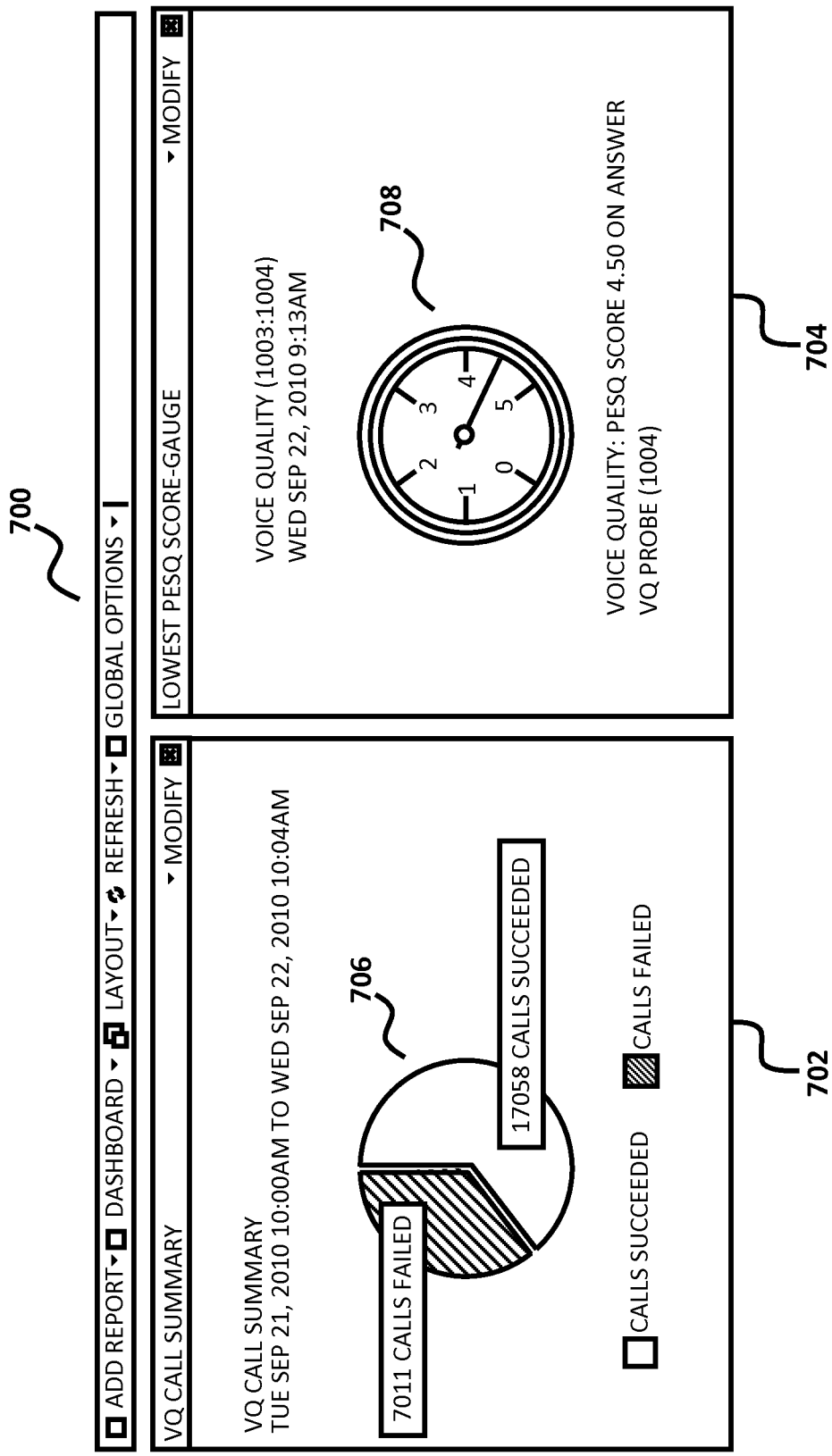
FIGS. 7A-7C illustrate embodiments of how results from voice quality probes can be presented via the web interface application.

FIGS. 7-9 illustrate how results from VQ Probes are presented via the web interface. The results are presented through dashboards, reports, and by looking directly at the results of Voice Quality Monitors. FIG. 7 illustrates an embodiment of a dashboard 700 including a VQ call summary report 702 and a lowest PESQ score report 704 used for reporting monitoring results. The VQ call summary report 702 includes a pie chart 706 for reporting the results of voice transaction call failures and successes. In FIG. 7A, the smaller section of the pie chart (which is striped) illustrates calls that failed and the larger section of the pie chart illustrates calls that succeeded. This type of visual representation allows for information to be easily conveyed to the user. Visual representations provide summaries of results, and if necessary further details can be explored. For example, the user may click the calls failed region, which can result in a window or a new panel being displayed that includes a list of logs for the failed calls. The visual representations are an effective tool to convey a large amount of information, including numerical results, in a manner that allows the user to easily understand the results of the data, trends in the data, and other significant statistics from the data without having to look at the actual raw data. In turn, the effective conveying of information reduces the amount of time spent by the user on troubleshooting the communications network.

In reference to FIG. 7A, another example of a visualization tool is the gauge 708 of lowest PESQ scores presented in the lowest PESQ score report 704. If the meter of gauge 708 were to drop below a certain level, this would prompt the user to troubleshoot the network. A set of actions may also be associated with the gauge dropping below a certain level. For example, an email may be sent to the user informing the user that part of the network needs to be investigated. Other actions that can be associated with the meter of gauge 708 dropping below a certain level can include creating an entry on a log and/or sending an email, a text message, or some other communication to one or more other users. In addition, the displayed gauge 708, as well as the pie chart 706, can be converted to an image which is subsequently included on the communication sent to the user. The gauge 708 can also identify the VQ Probes which yielded poor scores, allowing the user to easily localize the problem. While FIG. 7A illustrates a pie chart 702 and a gauge 704 as the monitor results tools, embodiments are not limited to these graphical representations. Alternative embodiments may display the information using bar charts, line charts, column bars, tables, and many other forms of representations now existing or hereafter created. In addition, embodiments of the pie chart 706, the gauge 708, or other graphical representations used, are not limited to static visual representations.

In an alternative embodiment, the result tools, or graphical representations used to summarize the results, can be interactive. The user may interact with a result tool with the mouse or keyboard. For example, hovering the mouse over the pie chart 706 may display numeric summaries. Interacting with the result tool can also display a menu that provides the user with further diagnostic options. Such further diagnostic options can include viewing the data set used by the result tool, editing of the data set, and viewing a subset of the data set with the result tool. Editing of the data set can allow the user to examine various scenarios and to examine the relationship between the data set and the displayed results. In addition, the result tool can update in real-time in response to the user editing the data set or the user selecting a different subset of the data set for viewing and analyzing with the result tool. For example, a user may edit the data set by replacing zero values with average values, with the result tool automatically updating the graphics being displayed in response to the user edits. In the case of the pie chart 706, the user selecting a subset of the entire data set may result in the resizing of two sections of the pie chart to reflect the result of the selected subset.

Figure 7B:
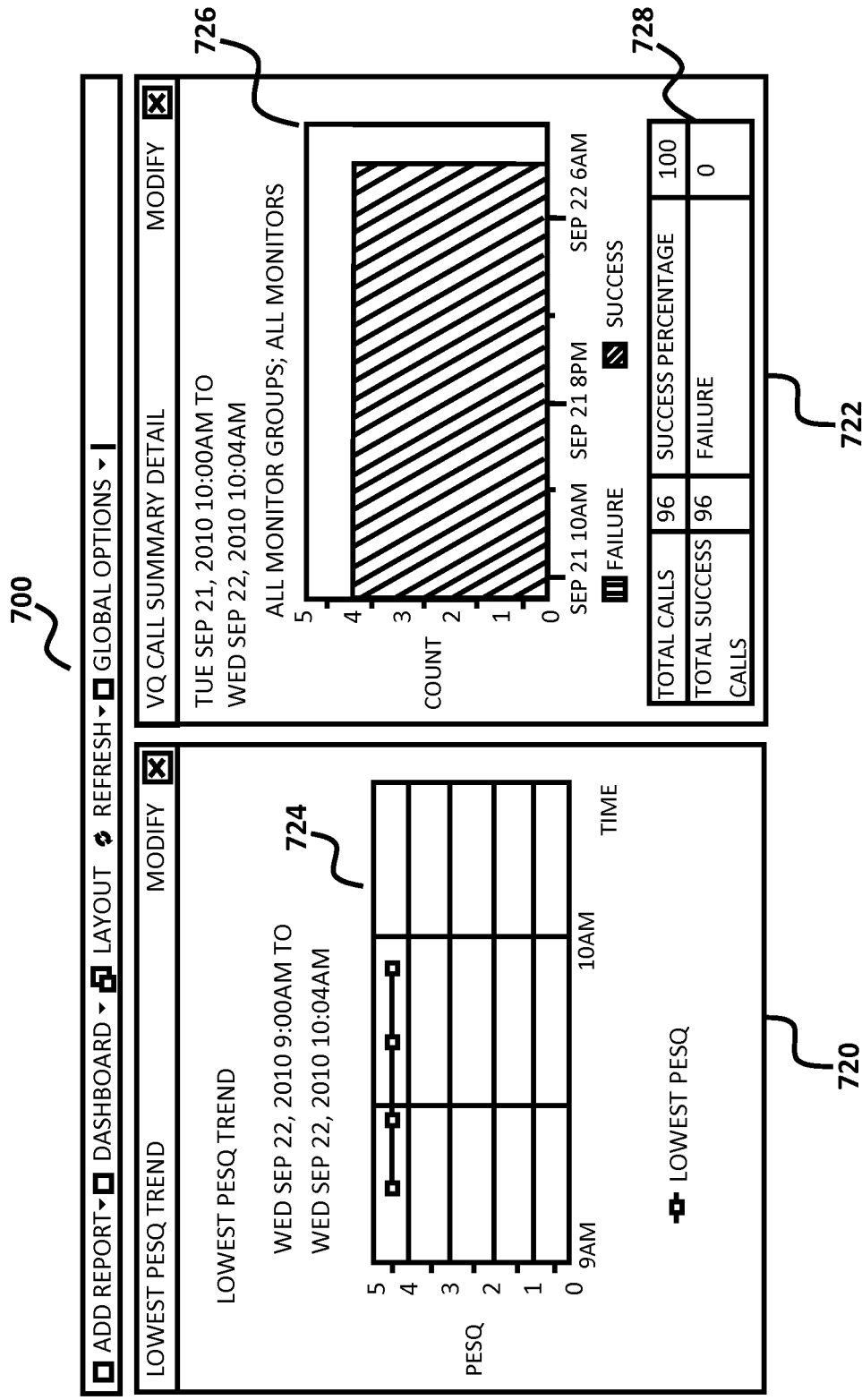

FIG. 7B illustrates an alternative embodiment of the dashboard 700 including a lowest PESQ trend report 720 and a voice quality call summary detail report 722. The lowest PESQ trend report 720 includes a line graph 724 showing the lowest PESQ scores of test calls made between two VQ Probes. The line graph 724 shows the lowest PESQ from 9 AM to 10:04 AM on Wednesday, September 22, 2010. The user has the option to change the time range of the line graph 724. For example, instead of viewing the results for one hour, the user can instead view the results for two hours, for the entire day, for an entire week, etc.

The voice quality call summary detail report 722 includes a bar chart 726 showing the PESQ scores for calls made between Tuesday September 21, 2010, 10:00 AM to Wednesday September 22, 2010, 10:04 AM, for all monitor groups and all monitors. The detail report 722 also includes a summary table 728 showing various numerical and statistical results associated with the calls made in the specified period of time.

The user can customize the results displayed in the bar chart by varying the time frame and varying the source of the data. For example, changing the time frame includes changing the period of time displayed from one day to one hour, two hours, a week, etc. Changing the source of the data consists of only displaying data associated with the sources selected by the user. As mentioned above in reference to FIG. 1, VQ Probes are installed and are configured to call each other. All of the data associated with calls made between VQ Probes are then transmitted to one or more monitoring servers. It is the monitoring servers which aggregate the data collected by the VQ Probes and may perform further analysis on the data collected. However, the data collection and data analysis can be performed or distributed between the VQ Probes and the monitoring server. For instance, in one embodiment the VQ Probes can collect data associated with calls made to other VQ Probes, compute metrics on the data collected, and send the results of the computed metrics to the monitoring server. In the embodiment, the VQ Probes may further send a subset of the raw data collected to the monitoring server, enabling the monitoring server to perform further analysis if necessary. In a second embodiment, the VQ Probes can collect data associated with calls made to other VQ Probes without performing any metrics or any analysis. All of the data collected by the VQ Probes can be subsequently sent in real-time or in batches to the monitoring server, with the monitoring server performing metrics on the data collected by each VQ Probe, performing other statistical analysis and metrics on data aggregated from two or more VQ Probes, and performing other statistical analysis on the entire aggregated data set from all the VQ Probes associated with the monitoring server.

As noted above, the web interface application or dashboard can be configured to provide access to the data and reports generated by a single monitoring server. Alternatively, the dashboard can provide the user with a centralized access to all of the data and reports generated by the plurality of monitoring servers created and configured by the user. For example, a user may install a total of eight VQ Probes in a contact center. The user can then configure half of the VQ Probes to transmit memory usage metrics, or data pertinent to memory usage, to a first monitoring server. The second half of the VQ Probes can be configured to transmit packet transmission metrics to a second monitoring server. The user can even configure the eight VQ Probes to send voice quality metrics to a third monitoring server. The results from the first monitoring server, the second monitoring server, the third monitoring server, and any other monitoring server created by the user, would then accessible via the dashboard.

Figure 7C:
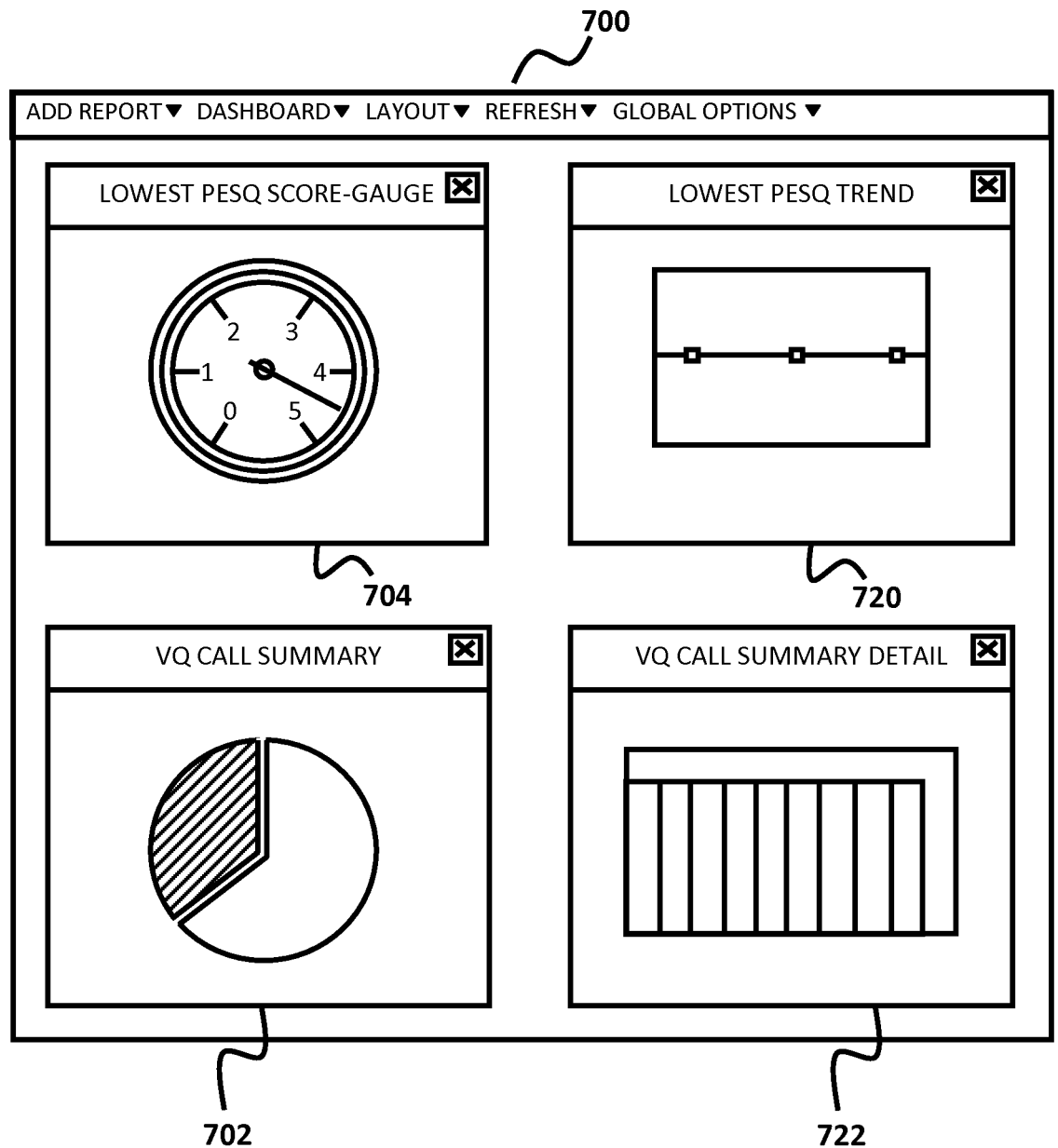

The dashboard 700 can be customized by the user by picking the type and number of reports to include. FIG. 7A illustrates two types of reports, whereas FIG. 7B illustrates two other types of reports. FIG. 7C illustrates yet another embodiment of the dashboard 700 including all of the reports from FIGS. 7A and 7B. The user is given the option to rearrange how the reports are displayed within the dashboard. For instance, the user can add and delete reports from the dashboard. In addition, the dashboard can include one or more first reports associated with one or more first monitors and one or more second reports associated with one or more second monitors.

Figure 8A:
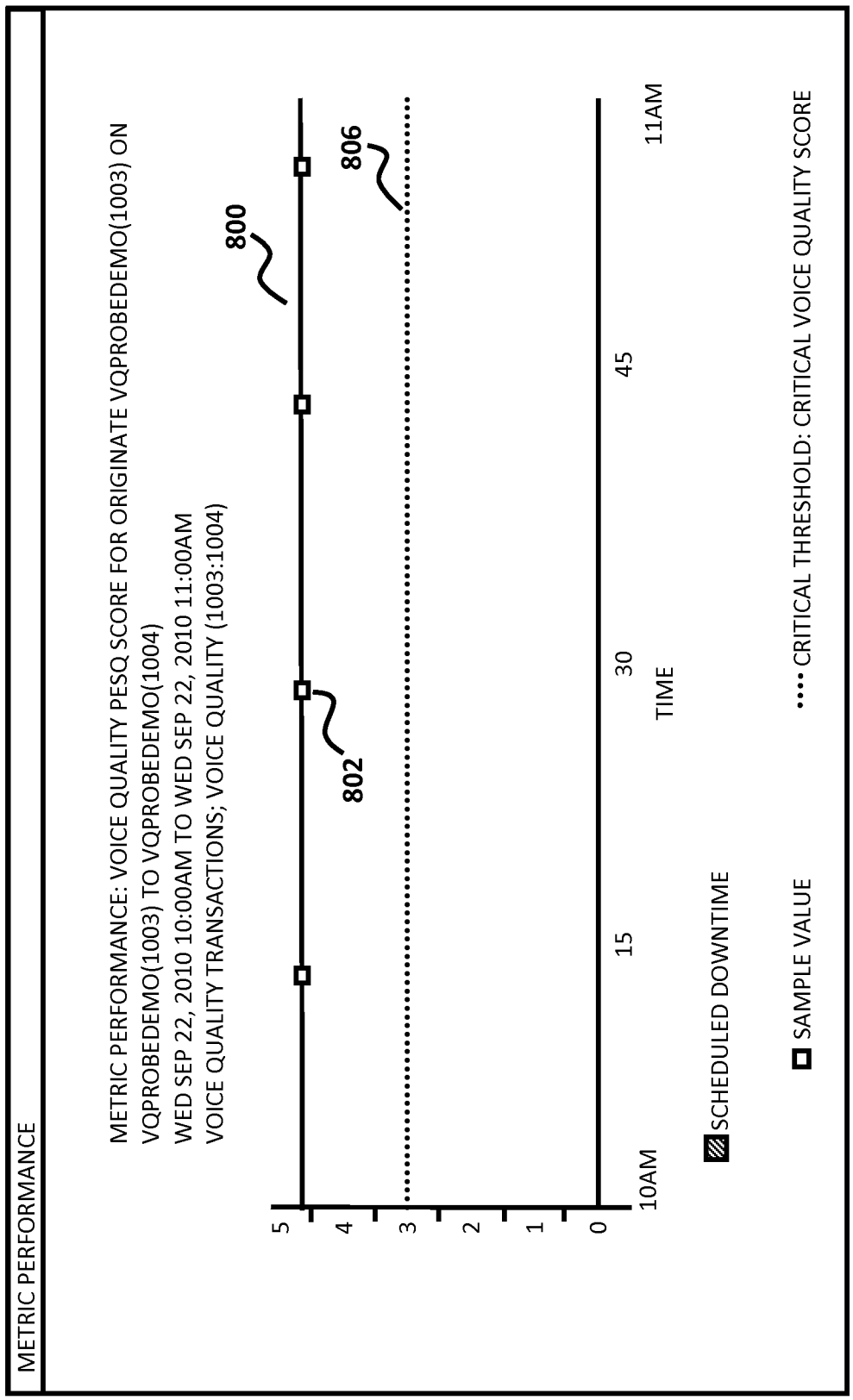

FIG. 8A shows an example of a timeline 800 showing how voice quality varies on numerous different calls over a one hour period. In this case, four calls, illustrated by the squares, were placed from the originate probe, VQPROBEDEMO (1003), to the answer probe, VQPROBEDEMO(1004), between just before 10:15 am and just before 11:00 am. The timeline can show a simple or more complex measure of the voice quality score for each call between the two VQ Probes. Alternatively, the timeline can show the average score for VQ Probes in a network.

Each square 802 in the timeline 800 represents a different call (a sample value). The dotted line 806 represents the acceptable voice quality threshold and is positioned at the PESQ score of 3.0. While PESQ scores can go as low as 1.0 for completely unacceptable calls, any scores below 3.0 indicate that the majority of users are dissatisfied with the quality of calls. Thus, the dotted line 806 helps a user or system administrator visualize how current scores compare with the acceptable voice quality threshold. The acceptable voice quality threshold can be further customized by the user. For example, the user may set the acceptable voice quality threshold at 3.5 or 4.0, instead of the 3.0 score displayed on FIG. 8A. The configuration of the acceptable voice quality threshold can be supported through the dashboard.

The metric performance timeline 800 and the corresponding metrics table 810 from FIG. 8B present various voice quality metrics 812, including comparisons of the quality at the originating VQ Probe 814 versus the quality at the answering VQ Probe 816. The voice quality metrics 812 include average jitter, average round trip time, number of dropped packets, number of duplicate packets, number of lost packets, MOS listening quality score, maximum jitter, maximum round trip time, the number of out of sequence packets, the PESQ score, the number of received packets, and the number of transmitted packets. The voice quality metrics 812 can also include the actual audio clip recorded at the originating VQ Probe and the answering VQ Probe, and the reference clip transmitted between the VQ Probes. As illustrated in FIG. 8B, the quality of the selected call placed at 09:28:12 AM was good, with relatively high MOS and PESQ scores and little difference between packets sent or received going in either direction. The metrics table 810 displays the summary for the voice call transaction selected on FIG. 8A.

The metrics table 810 may present the summary of a single voice transaction between two VQ Probes, as shown in FIG. 8B, but may also present the summary of various voice transactions between two VQ Probes over a period of time. For instance, rather than selecting a single sample value 802 from the timeline 800 with the mouse or keyboard, the user could select multiple sample values 802, with the metrics table 810 then displaying average values for the selected sample values. Alternatively, the user can view the summary for each call in the metrics table 810 by using the previous call and next call buttons. The metric performance timeline 800 and metric table 810 illustrated in FIGS. 8A and 8B are just examples of many different types of timelines or tables, or other ways of representing the same type of data with result tools.

Figure 9A:
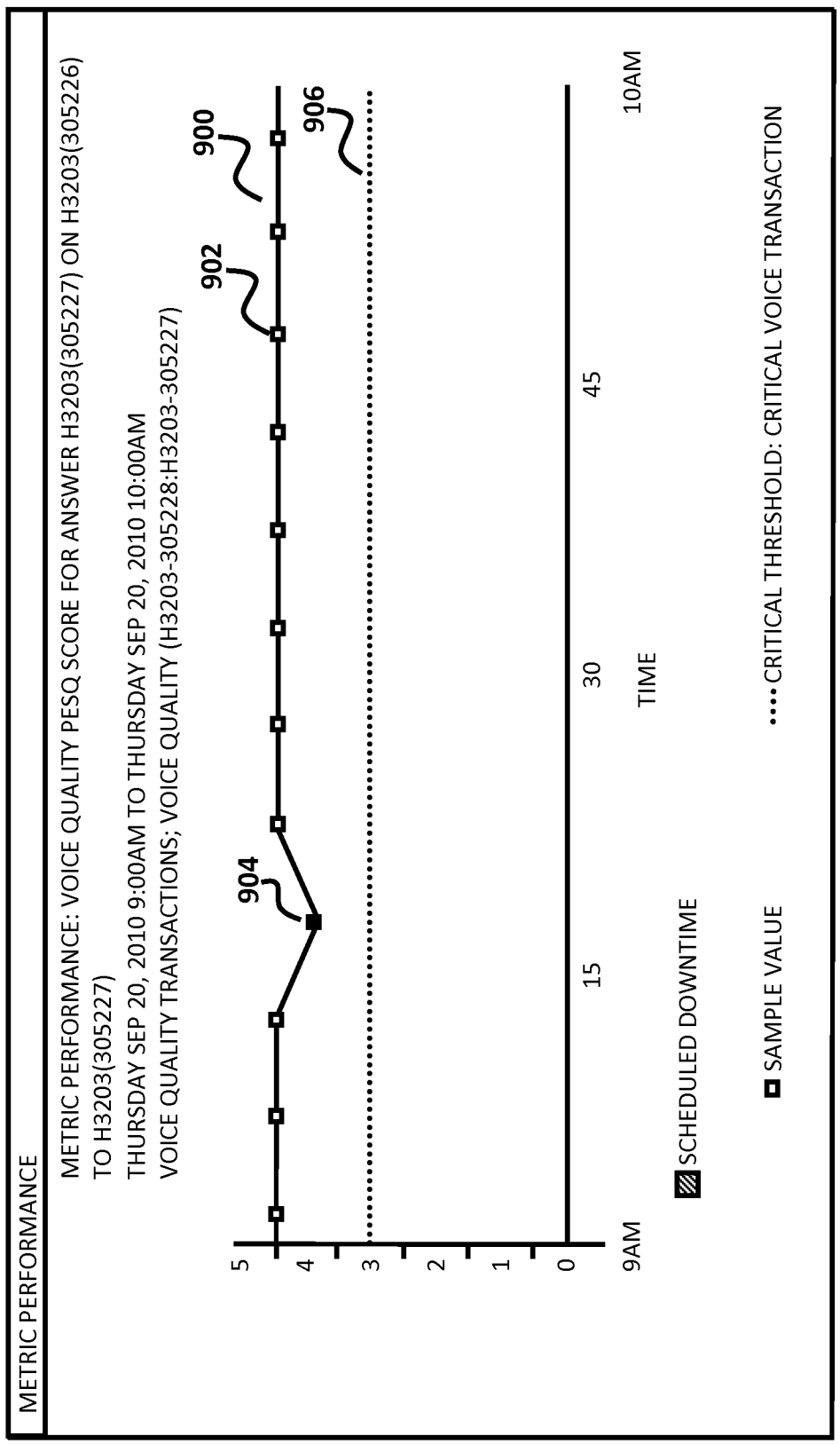

FIG. 9A illustrates a metric performance timeline 900 for calls placed between originate probe H3203-305226 and receiving probe H3203-305227 between the hours of 9 AM and 10 AM, and FIG. 9B illustrates the corresponding metric table 910. As illustrated in FIGS. 9A and 9B, one call during the timeline, at 9:17:13 AM, suffered from a quality issue. This call is indicated in FIG. 9A as sample value 904 having a lower PESQ score than the rest of the sample values. Even though the sample value 904 has a lower PESQ score, it still has a reasonable PESQ score that is above the critical threshold value 906. As noted above, a user can select any of the sample values with the mouse or keyboard. The selection of a sample value is reflected by changing the appearance of the corresponding sample value. The appearance of the corresponding sample value can be changed by changing the color of the sample value, changing the shape of the sample value, adding an annotation next to the sample value, changing the outline of the sample value, changing the size of the sample value, or by adding a notification on the screen. In FIG. 9B, the sample value 904 is colored black to indicate that it has been selected. By selecting this call, the metrics table 910 of FIG. 7B is populated with the metrics associated with the call. This further enables the user to analyze the call and begin to troubleshoot the quality problem associated with that particular call and the communications network that was used.

The dotted line 906 indicates the acceptable voice quality threshold positioned at the PESQ score of 3.0. As previously discussed, the acceptable voice quality threshold can be changed by the user through the web application, with this change subsequently reflected in timelines presented and in other result tools. The acceptable voice quality threshold can also be used to trigger events, alerts or notifications sent to one or more users. For example, if the quality of a call dropped below the acceptable voice quality threshold, then a notification email can be sent to the system administrator informing him/her for the need to troubleshoot a portion of the communications network.

The metrics table 910 includes comparison of voice quality metrics 912 at the originating VQ Probe 914 versus at the answering VQ Probe 916. As shown in FIG. 9B, the problem call had a MOS-LQ score that dropped from 4.5 to 4.27 and a PESQ score that dropped from 4.5 to 4.12. In an embodiment, the metrics can be configured such that MOS scores are not greater than PESQ scores. The cause behind the lower scores appears to be indicated by the number of duplicated packets (40) and dropped packets (6) detected at the receiving probe (answering VQ Probe 916). The fact that there were dropped and duplicated packets at the server on the receiving end at a particular point in time, such as just after a call center or enterprise opens at 9 AM, might cause the user to perform a detailed analysis of that receiving server. If the problem occurred, for example, when traffic coming into that server was higher at that singular point in time than at other monitored points in time, then the user might be able to trace the problem back to an overloaded router connected to the server that needs to be replaced or updated. Or, it might be determined that it is necessary to add more bandwidth coming into the call center or enterprise, etc. Other factors that can influence the voice quality of a call can include a faulty switch or router; a switch or router shutting down; or a switch, router, or other network device being configured incorrectly.

In one embodiment, a visual representation of a network is created and is accessible via the web interface application. The visual representation of the network may be similar to the high level deployment diagram illustrated in FIG. 1. The visual network may include the relative location of VQ Probes and other network components, such as switches, routers, and gateways. The visual network can be interactive. For example, a user may select a VQ Probe in the visual network with a pointer. In response, a dialog window may be displayed to the user presenting metric performance summaries for that particular VQ Probe, such as a MOS gauge and pie chart as illustrated in FIG. 7A, a metric performance timeline as illustrated in FIGS. 8A and 9A, a metrics table as illustrated in FIGS. 8B and 9B, or using some other result tool. The visual representation of the network may also show VQ Probes programmed to call each other and conduct bi-directional tests by displaying a line between the corresponding VQ Probes. The lines between two VQ Probes can also be annotated or visually decorated in order to present results of the tests being conducted. For example, color representations can be used to represent different results, where one color, such as green, can represent a high metric test result or pre-defined "passing" score; another color, such as yellow, can represent a warning of potential fault; and a third color, such as red, can represent a pre-defined "failing" score or otherwise a failed call. Different line patterns can also be used to present different results. For example, a dashed line can represent failing scores, while solid lines can represent high voice quality scores. Lines can also be annotated with text or with an icon.

Alternative network visualizations can also be used. For instance, a plurality of VQ Probes can be visually displayed as a set of nodes, with lines between the set of nodes representing VQ Probes programmed to call each other.

Where a low voice quality score is presented, the monitoring server has the ability to correlate a corresponding voice quality monitor with other monitors. For example, the user can set up monitors for their switches, routers, and other network devices. The user can select attributes for these monitors that would logically connect them with the voice quality monitor. Notes can also be added to monitors. For example, an embodiment enables a user to include a note in a monitor stating that the monitor is part of the VOIP infrastructure. When a low voice quality score occurs, the monitoring server can logically group related monitors dealing with voice quality and present them to the user for viewing, and determine the reason for the low score. Factors that can affect the performance of a network device can include one of the switches being overloaded and dropping packets, or one of the routers failing completely. Embodiments not only have the ability to report low scores, but to also help the user diagnose the cause.

As described above, alerts may be sent to one or more users in response to events related to voice quality performance in a contact center or network. Alerts may be comprised of an email, text message, or some other type of text or voice message. The web interface application allows the user to specify the events which trigger the alerts. For example, an alert may be sent if the MOS score in a VQ Probe drops below 3.0. The user may define several such events, and various users may be informed based on the event type. For example, embodiments permit the user to set a parameter that would cause an alert to be sent to a system administrator from a contact center A if a VQ Probe in contact center A receives a score lower than 3.0. Alternatively, if the VQ Probe in contact center B received a low score, then the corresponding system administrator from contact center B would receive the alert.

In an embodiment virtual agents emulate the calls between VQ Probes. The behavior of the virtual agents can be controlled with one or more scripts. The virtual agents can be asynchronous agents that emulate the calls by emulating actions on the interfaces typically used by human agents to perform an action. The VQ Probes work in conjunction with the virtual agents, with the actual measurements and data gathering associated with a VOIP call managed and stored by the VQ Probe. In an embodiment, the web interface can enable the user to edit a script or to upload a script to be used by VQ probes. As noted above, the script can dictate the sequence of steps to be performed by each VQ Probe, including playing a prompt, listening to a prompt, dropping the call, emulating a busy tone, calculating the voice quality score, etc.

The web interface application can further provide the user with signaling diagnostic tools to allow the user to see the various signals exchanged over the course of a VOIP call. Such various signals during a test call may include the call setup, media negotiation, invites, acknowledgments, and call tear down, among others.

Embodiments of the VQ Probes can also be configured to track the path followed by a call from the originating VQ Probe to the answering VQ Probe, and vice-versa. The path of the call can be presented via the web interface application by using a visual diagram or by using a simple text representation. In a visual diagram, the particular path followed by a call can be highlighted with a different color, a different texture or pattern, or by annotating the sections of the path. If the path is presented using a text representation, the path can be presented as a list enumerating the identifiers for all of the network components through which the call traversed. The identifiers for the network components can be their assigned names or even their MAC addresses. The ability to trace the route of a call provides users with the ability to narrow down the areas to troubleshoot within a large communications network.

As noted above, embodiments of the VQ Probes are not limited to measuring voice quality. VQ Probes can also be used for measuring the quality of other data, such as video quality by having a first VQ Probe play a video clip to a second VQ Probe, the second VQ Probe records the received video clip, and the recorded video clip is compared against a reference video clip to generate a Perceptual Evaluation of Video Quality (PEVQ). The second VQ Probe subsequently plays a video clip that is transmitted to the first VQ Probe. The first VQ Probe records the received video clip, and compares it against the reference video to generate the PEVQ. The PEVQ computed by the VQ Probes are then transmitted to a monitoring server. Video quality can also be analyzed by examining packet information or other video specific metrics, including signal-to-noise ratio and peak signal-to-noise ratio.

The metrics computed by the VQ Probes can also be combined with one or more subjective metrics. For instance, the data transmitted from the first VQ Probe to the second VQ Probe can be presented to the testing user or to the administrator, with the testing user or administrator providing a numeric score or by rating the quality of the data using a rating scale, such as the Likert scale. If the data was voice data, then the sound clip recorded by the VQ Probe would be played to the user. On the other hand, if the data was video data, then the video clip recorded by the VQ Probe would be played to the user. It would be unrealistic to expect a testing user or administrator to provide a subjective score every time a test call between two VQ Probes is performed. Therefore, embodiments can prompt the testing user or the administrator to provide a subjective score once per day, twice per day, once per hour, twice per hour, or based on some other frequency. The administrator or testing user can be given the option to specify the frequency for prompting the user to provide a subjective score.

While the present invention has been illustrated and described herein in terms of various embodiments, it is to be understood that the techniques described herein can have a multitude of additional uses and applications. Accordingly, the invention should not be limited to just the particular description and various drawing figures contained in this specification that merely illustrate embodiments and application of the principles of the invention.

What is claimed is:

1. A method of determining bi-directional data quality scores, comprising the steps of:
    associating each VQ (Voice Quality) Probe among a set of VQ Probes with a network location among a plurality of network locations, wherein each VQ probe can determine bi-directional data quality scores with more than one other VQ Probe among the set of VQ Probes;
    constructing a graph of links between pairs of VQ Probes among the set of VQ Probes, wherein each link consists of a first VQ Probe of each link and a second VQ Probe of each link, and wherein the links in the graph are a subset of all possible links such that the graph does not include links between every possible pair of VQ Probes;
    modifying the graph of links by creating or deleting links when conditional criteria are met; and
    testing one or more links in the graph by:
        for each link tested, initiating an Internet Protocol (IP) call between the first VQ Probe of each link tested and the second VQ Probe of each link tested;
        transmitting a first prompt of a first active data quality test of each link tested from the first VQ Probe of each link tested to the second VQ Probe of each link tested, the second VQ Probe of each link tested receiving the first prompt;
        measuring one or more first metrics of each link tested associated with the first prompt and producing one or more first scores of the first active data quality test of each link tested;
        transmitting a second prompt of a second active data quality test of each link tested from the second VQ Probe of each link tested to the first VQ Probe of each link tested, the first VQ Probe of each link tested receiving the second prompt;
        measuring one or more second metrics of each link tested associated with the second prompt and producing one or more second scores of the second active data quality test of each link tested;
        transmitting the one or more first scores of each link tested and the one or more second scores of each link tested to a monitoring server as the bi-directional data quality scores of each link tested; and
        generating one or more reports of each link tested based on at least the bi-directional data quality scores of each link tested, the one or more first metrics of each link tested, and the one or more second metrics of each link tested.

2. The method as recited in claim 1, further comprising the steps of:
    displaying a panel on a display of a computer controlling the first VQ Probe of each link tested and the second VQ Probe of each link tested;
    receiving input from a user within the panel establishing the first active data quality test of each link tested and the second active data quality test of each link tested; and
    receiving input from the user within the panel scheduling the first active data quality test of each link tested and the second active data quality test of each link tested.

3. The method as recited in claim 2, further comprising the step of displaying the one or more reports to the user on the display.

4. The method as recited in claim 2, wherein the step of receiving input from a user within the panel establishing the first active data quality test of each link tested includes the steps of:
    receiving from the user one or more first settings associated with the first VQ Probe of each link tested;
    receiving from the user the one or more user-defined metrics from a plurality of metrics and combining the one or more user-defined metrics with a set of pre-defined metrics to create the one or more first metrics of each link tested;
    receiving from the user one or more first metric settings associated with the one or more first metrics of each link tested;
    receiving from the user one or more alerts associated with a metric from the one or more first metrics of each link tested; and
    receiving from the user one or more actions executed in response to the one or more alerts.

5. The method as recited in claim 2, wherein the step of receiving input from a user within the panel establishing the second active data quality test of each link tested includes the steps of:
    receiving from the user one or more second settings associated with the second VQ Probe of each link tested;

receiving from the user the one or more user-defined metrics from a plurality of metrics and combining the one or more user-defined metrics with a set of pre-defined metrics to create the one or more second metrics of each link tested;

receiving from the user one or more second metric settings associated with the one or more second metrics of each link tested;

receiving from the user one or more alerts associated with a metric from the one or more second metrics of each link tested; and receiving from the user one or more actions executed in response to the one or more alerts.

6. The method as recited in claim 1, further comprising the step of receiving a user recording of the first prompt prior to the step of transmitting the first prompt.

7. The method as recited in claim 1, further comprising the step of receiving a user recording of the second prompt prior to the step of transmitting the second prompt.

8. The method as recited in claim 1, wherein the one or more first metrics and the one or more second metrics include a jitter, a round trip delay, a number of lost packets, a number of duplicate packets, a number of dropped packets, a number of out of sequence packets, a maximum jitter, a maximum round trip time, an average jitter, an average round trip time, a number of received packets, and a number of transmitted packets.

9. The method as recited in claim 1, wherein data for the first active data quality test and for the second active data quality test is voice data, and wherein a protocol of the IP call is selected from the group consisting of SIP, H.323, SCCP, UNIStim, a VOIP protocol, and a telephony protocol.

10. The method as recited in claim 1, wherein data for the first active data quality test and for the second active data quality test is voice data, and wherein the IP call supports an audio codec.

11. The method as recited in claim 10, wherein the audio codec is selected from the group consisting of G.711, G.723, and G.729.

12. The method as recited in claim 1, wherein the first prompt is substantially the same as the second prompt.

13. The method as recited in claim 1, wherein the first prompt is a reference prompt selected from a plurality of reference prompts.

14. The method as recited in claim 13, wherein data for the first active data quality test and for the second active data quality test is voice data, and wherein the step of measuring one or more first metrics of each link tested of each link includes the step of comparing the first prompt to the reference prompt using a Perceptual Evaluation of Speech Quality (PESQ) test algorithm.

15. The method as recited in claim 1, wherein the second prompt is a reference prompt selected from a plurality of reference prompts.

16. The method as recited in claim 15, wherein data for the first active data quality test and for the second active data quality test is voice data, and wherein the step of measuring one or more second metrics of each link tested includes the step of comparing the second prompt to the reference prompt using a Perceptual Evaluation of Speech Quality (PESQ) test algorithm.

17. The method as recited in claim 1, wherein data for the first active data quality test and for the second active data quality test is voice data, and wherein the step of measuring one or more first metrics of each link tested includes the step of comparing the first prompt to the first prompt using a Perceptual Evaluation of Speech Quality (PESQ) test algorithm.

18. The method as recited in claim 1, wherein data for the first active data quality test and for the second active data quality test is voice data, and wherein the step of measuring one or more second metrics of each link tested includes the step of comparing the second prompt to the second prompt using a Perceptual Evaluation of Speech Quality (PESQ) test algorithm.

19. The method as recited in claim 1, wherein data for the first active data quality test and for the second active data quality test is voice data, and wherein the step of transmitting a first prompt includes the steps of:

recording an audio clip of the first prompt; and attaching the audio clip to a record associated with the IP call.

20. The method as recited in claim 1, wherein data for the first active data quality test and for the second active data quality test is voice data, and wherein the step of transmitting a second prompt includes the steps of:

recording an audio clip of the second prompt; and attaching the second audio clip to a record associated with the IP call.

21. The method as recited in claim 1, wherein the network location of the first VQ probe of at least one link tested is within a contact center and wherein the network location of the second VQ Probe of the at least one link tested is outside the contact center.

22. The method as recited in claim 1, wherein the network location of the first VQ probe of at least one link tested is outside a contact center and network location of the second VQ Probe of the at least one link tested is inside the contact center.

23. The method as recited in claim 1, wherein the network location of the first VQ probe of at least one link tested is inside a contact center and the network location of the second VQ Probe of the at least one link tested is inside the contact center.

24. The method as recited in claim 1, wherein data for the first active data quality test and for the second active data quality test is voice data, and wherein the first VQ Probe of at least one link tested and the second VQ Probe of the at least one link tested are registered as phone extensions on an Internet Protocol Private Branch Exchange (IP-PBX) network.

25. The method as recited in claim 1, further comprising the steps:

aggregating a plurality of the bi-directional data quality scores of each link tested into an aggregated scores; and generating one or more summary reports based on the aggregated scores.

26. The method as recited in claim 1, wherein data for the first active data quality test and for the second active data quality test is voice data, and wherein the one or more first metrics and the one or more second metrics include a jitter, a round trip delay, a number of lost packets, a number of duplicate packets, a number of dropped packets, a number of out of sequence packets, a MOS listening quality score, a maximum jitter, a maximum round trip time, an average jitter, an average round trip time, a Perceptual Evaluation of Speech Quality (PESQ) score, a number of received packets, and a number of transmitted packets.

27. The method as recited in claim 1, wherein data for the first active data quality test and for the second active data quality test is video data, and wherein the one or more first metrics and the one or more second metrics include a jitter, a round trip delay, a number of lost packets, a number of duplicate packets, a number of dropped packets, a number of out of sequence packets, a maximum jitter, a maximum round trip time, an average jitter, an average round trip time, a Perceptual Evaluation of Video Quality (PEVQ) score, a number of received packets, a number of transmitted packets, a signal-to-noise ratio, and a peak signal-to-noise ratio.

28. The method as recited in claim 1, wherein data for the first active data quality test and for the second active data quality test is video data, and wherein the step of measuring one or more first metrics of each link tested includes the step of comparing the first prompt to a reference prompt using a Perceptual Evaluation of Video Quality (PEVQ) test algorithm.

29. The method as recited in claim 1, wherein data for the first active data quality test and for the second active data quality test is video data, and wherein the step of measuring one or more second metrics of each link tested includes the step of comparing the second prompt to a reference prompt using a Perceptual Evaluation of Video Quality (PEVQ) test algorithm.

30. The method as recited in claim 1, wherein data for the first active data quality test and for the second active data quality test is video data, and wherein the step of transmitting a first prompt includes the steps of:
  recording a video clip of the first prompt; and
  attaching the video clip to a record associated with the IP call.

31. The method as recited in claim 1, wherein data for the first active data quality test and for the second active data quality test is video data, and wherein the step of transmitting a second prompt includes the steps of:
  recording a video clip of the second prompt; and
  attaching the second video clip to a record associated with the IP call.

32. A method of determining active voice quality scores and passive voice quality scores, comprising the steps of:
  associating each VQ (Voice Quality) Probe among a set of VQ Probes with a network location among a plurality of network locations, wherein each VQ probe can determine bi-directional data quality scores with more than one other VQ Probe among the set of VQ Probes;
  constructing a graph of links between pairs of VQ Probes among the set of VQ Probes, wherein each link consists of a first VQ Probe of each link and a second VQ Probe of each link, and wherein the links in the graph are a subset of all possible links such that the graph does not include links between every possible pair of VQ Probes;
  modifying the graph of links by creating or deleting links when conditional criteria are met; and
  testing one or more links in the graph by:
    for each link tested, initiating an Internet Protocol (IP) call between the first VQ Probe of each link tested and the second VQ Probe of each link tested;
    transmitting a first prompt of a first active voice quality test of each link tested from the first VQ Probe of each link tested to the second VQ Probe of each link tested, the second VQ Probe of each link tested receiving the first prompt;
    measuring one or more first metrics of each link tested associated with the first prompt and producing one or more first scores of the first active voice quality test of each link tested;
    transmitting a second prompt of a second active voice quality test of each link tested from the second VQ Probe of each link tested to the first VQ Probe of each link tested, the first VQ Probe of each link tested receiving the second prompt;
    measuring one or more second metrics of each link tested associated with the second prompt and producing one or more second scores of the second active voice quality test of each link tested;
    transmitting the one or more first scores of each link tested and the one or more second scores of each link tested to a monitoring server as the active voice quality scores of each link tested;
    passively monitoring one or more other calls received by the second VQ Probe of each link tested;
    measuring one or more third metrics associated with the one or more other calls and producing one or more third scores of the other calls;
    transmitting the one or more third scores to the monitoring server as the passive voice quality scores of each link tested; and
    generating one or more reports based on at least the active voice quality scores of each link tested, the passive voice quality scores of each link tested, the one or more first metrics of each link tested, and the one or more second metrics of each link tested.

* * * * *